United States Patent
Yashiro et al.

(10) Patent No.: US 9,880,680 B2
(45) Date of Patent: Jan. 30, 2018

(54) TOUCH-PANEL SUBSTRATE WITH CONDUCTOR LINES INCLUDING A WIDE WIDTH PORTION, METHOD FOR MANUFACTURING TOUCH-PANEL SUBSTRATE, AND ELECTRONIC DEVICE

(71) Applicant: Sharp Kabushiki Kaisha, Osaka-shi, Osaka (JP)

(72) Inventors: Yuhji Yashiro, Osaka (JP); Kazutoshi Kida, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 6 days.

(21) Appl. No.: 14/649,219

(22) PCT Filed: Dec. 24, 2013

(86) PCT No.: PCT/JP2013/084511
§ 371 (c)(1),
(2) Date: Jun. 3, 2015

(87) PCT Pub. No.: WO2014/104028
PCT Pub. Date: Jul. 3, 2014

(65) Prior Publication Data
US 2015/0317010 A1    Nov. 5, 2015

(30) Foreign Application Priority Data

Dec. 28, 2012 (JP) .................. 2012-288923

(51) Int. Cl.
*G06F 3/044* (2006.01)
*G06F 3/041* (2006.01)
*G06F 1/16* (2006.01)

(52) U.S. Cl.
CPC ............... *G06F 3/044* (2013.01); *G06F 1/16* (2013.01); *G06F 3/0412* (2013.01); *G06F 2203/04103* (2013.01); *G06F 2203/04112* (2013.01)

(58) Field of Classification Search
CPC ............. G06F 1/16; G06F 2203/04103; G06F 2203/04112; G06F 3/0412; G06F 3/044
See application file for complete search history.

(56) References Cited

U.S. PATENT DOCUMENTS

| | | | |
|---|---|---|---|
| 2009/0002337 A1* | 1/2009 | Chang | G06F 3/044 345/174 |
| 2010/0045614 A1* | 2/2010 | Gray | G06F 3/044 345/173 |
| 2010/0045615 A1 | 2/2010 | Gray et al. | |

(Continued)

FOREIGN PATENT DOCUMENTS

| | | |
|---|---|---|
| CN | 101655754 A | 2/2010 |
| JP | 4989749 B2 | 8/2012 |

*Primary Examiner* — Ram Mistry
(74) *Attorney, Agent, or Firm* — Keating & Bennett, LLP

(57) ABSTRACT

Provided are (i) a touch panel substrate improved in uniformity of in-plane light transmittance and (ii) an electronic device employing the touch panel substrate. A plurality of first sensor electrodes (11) are formed by dividing first conductor lines (13). At least one of a pair of ends of the first conductor lines (13), which pair of ends face each other via a dividing line along which the first conductor lines (13) are divided, has a wide width part (40) which is wider than the other part of the first conductor lines (13), when viewed from above.

15 Claims, 29 Drawing Sheets

(56) References Cited

U.S. PATENT DOCUMENTS

2011/0291966 A1    12/2011  Takao et al.
2012/0044202 A1*  2/2012  Ishizaki .............. G02F 1/13338
                                                    345/174

* cited by examiner

F I G. 1
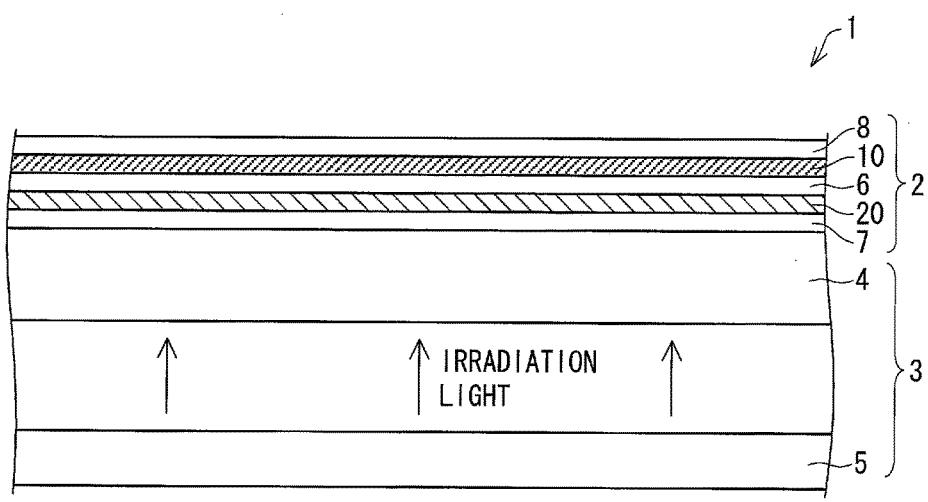

F I G. 3
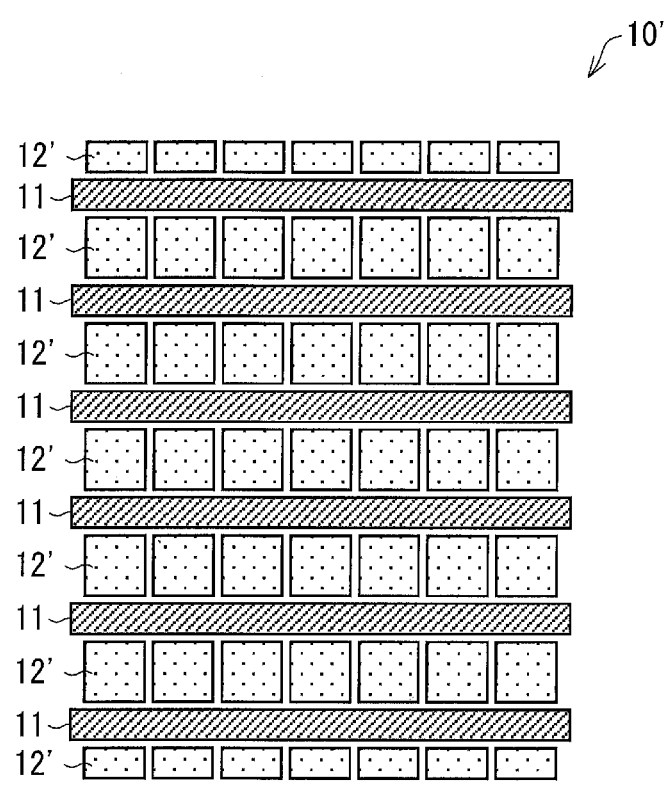

F I G. 5
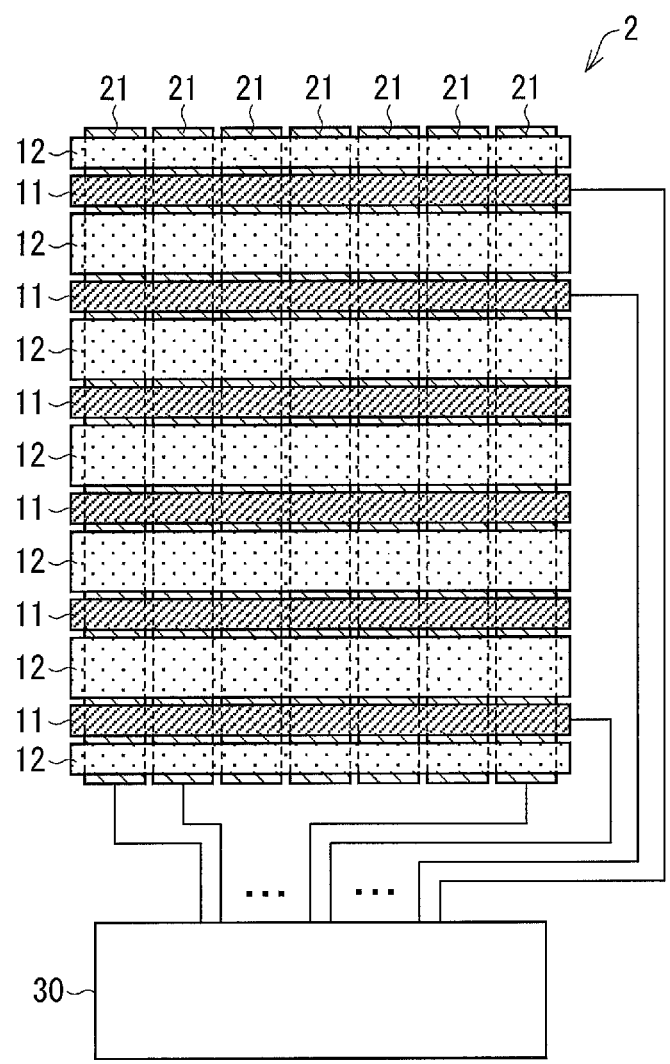

F I G. 1 0
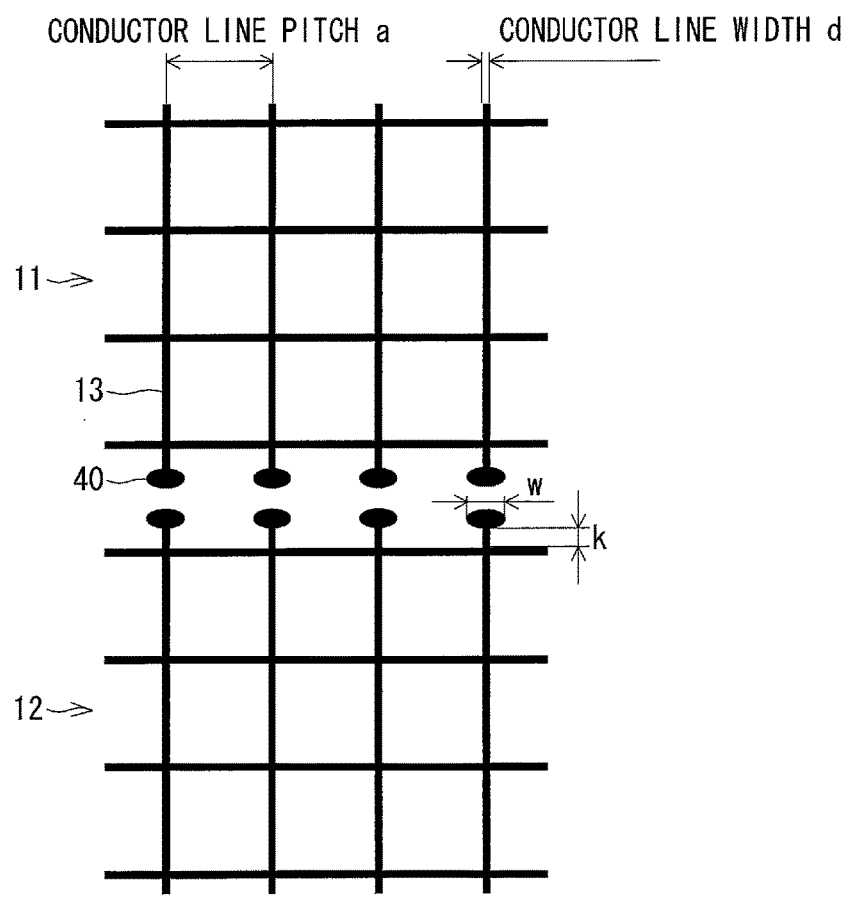

F I G. 2 3
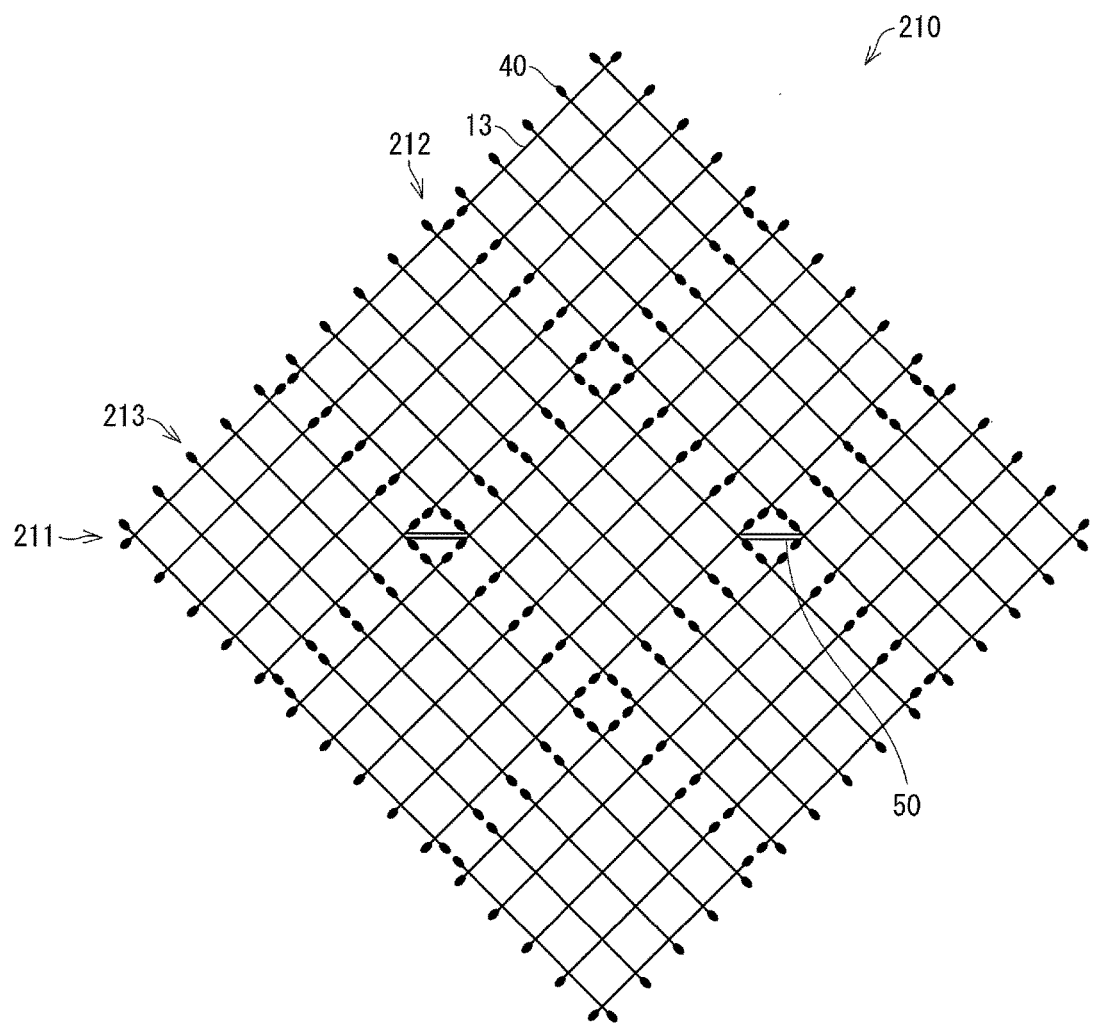

F I G. 2 8
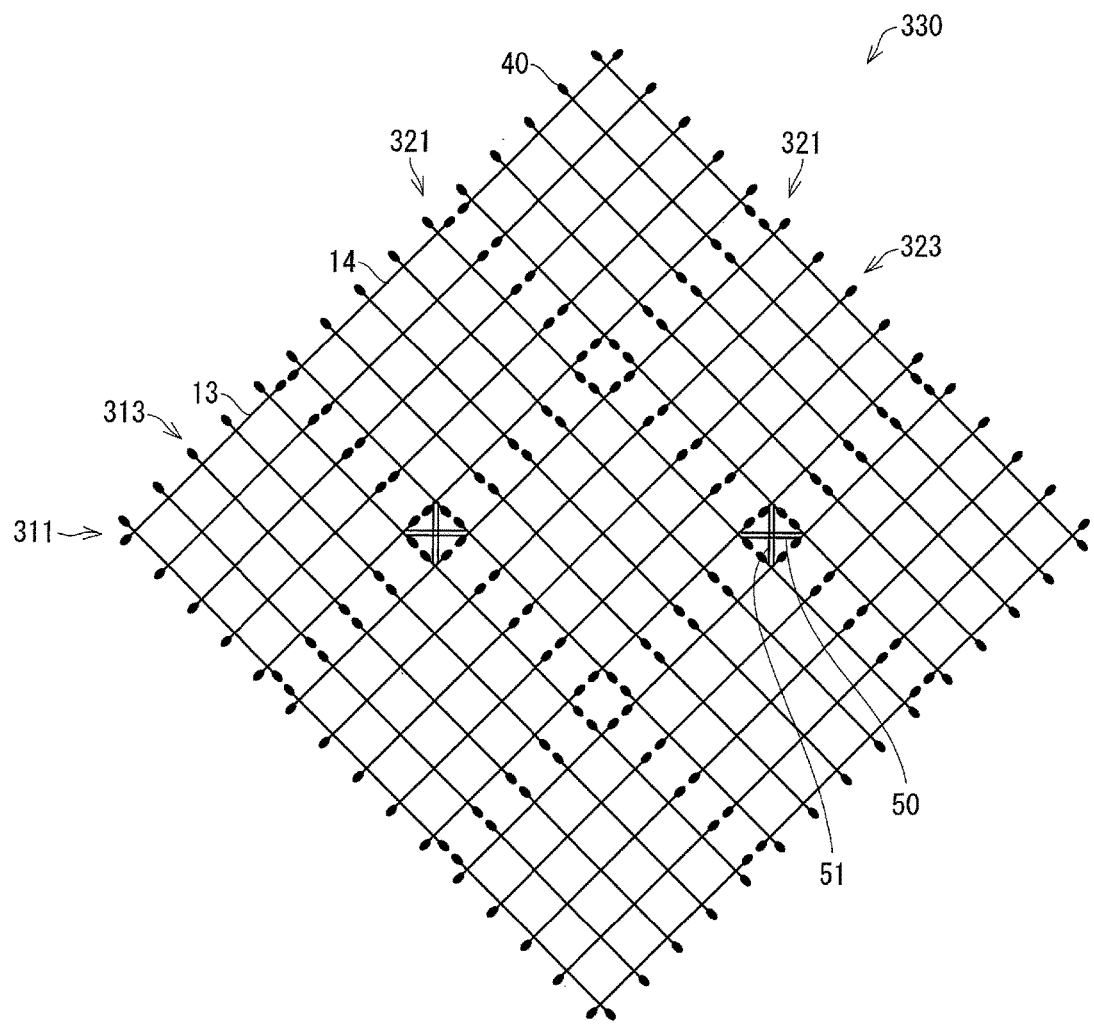

TOUCH-PANEL SUBSTRATE WITH CONDUCTOR LINES INCLUDING A WIDE WIDTH PORTION, METHOD FOR MANUFACTURING TOUCH-PANEL SUBSTRATE, AND ELECTRONIC DEVICE

TECHNICAL FIELD

The present invention relates to a touch panel substrate, a method of manufacturing a touch panel substrate, and an electronic device employing a touch panel substrate.

BACKGROUND ART

A touch panel has a plurality of electrodes which are electrically insulated from each other. The touch panel is capable of detecting a contact position, where a detection target is in contact with a detection surface, by detecting a change in capacitance in an electrode which change is produced in a case where a finger or an input pen is brought into contact with a detection surface. Such electronic devices are widely used that a touch panel is provided on a display surface of a display device and that allows a user to input an operation via a display screen while the user is looking at a displayed image.

Patent Literature 1 discloses a touch panel device capable of suppressing a moire that occurs in a case where first electrodes are superimposed on second electrodes.

FIG. 29 is a plan view illustrating a configuration of a touch panel device of Patent Literature 1. (a) of FIG. 29 is a plane view illustrating a configuration of a touch panel device in which a first electrode substrate 404 is superimposed on a second electrode substrate 406. (b) of FIG. 29 is a plan view illustrating a configuration of the first electrode substrate 404. (c) of FIG. 29 is a plan view illustrating a configuration of the second electrode substrate 406.

According to the touch panel device of Patent Literature 1, the first electrode substrate 404 is configured such that a plurality of first electrodes 403 are provided in parallel to each other at regular intervals (see (b) of FIG. 29). Each of the plurality of first electrodes 403 is made up of conductor lines. The conductor lines have a rhombic grid shape.

Further, the second electrode substrate 406 is configured such that a plurality of second electrodes 45 are provided in parallel to each other at regular intervals (see (c) of FIG. 29). Each of the plurality of second electrodes 405 is made up of conductor lines. The conductor lines have a rhombic grid shape.

By thus providing a plurality of electrodes on an identical substrate at regular intervals, the plurality of electrodes are electrically insulated from each other. This allows a contact position, where a detection target is in contact with a detection surface, to be detected by detection of a change in capacitance in an electrode.

CITATION LIST

Patent Literature 1

Japanese Patent No. 4989749 B (Publication Date: Aug. 1, 2012)

SUMMARY OF INVENTION

Technical Problem

The touch panel device of Patent Literature 1 is configured such that the plurality of electrodes are provided on the identical substrate at the regular intervals so as to be insulated from each other. Therefore, although the conductor lines are provided as each of the plurality of first electrodes 403, there is a space, between adjacent ones of the plurality of first electrodes 403, where no conductor line is provided. Similarly, although the conductor lines are provided as each of the plurality of second electrodes 405, there is a space, between adjacent ones of the plurality of second electrodes 405, where no conductor line is provided.

A region where no conductor line is provided when viewed from above is high in light transmittance. Therefore, a difference arises in light transmittance between (i) a region where each of the plurality of electrodes is provided and (ii) a region where no electrode is provided.

Accordingly, in a case where the touch panel device of Patent Literature 1 is provided on a display surface of a display device, light transmittance of an image displayed by the display device is ununiform. This causes visual problems such that a pattern formed along shapes of the plurality of first electrodes 403 and the plurality of second electrodes 405 is visually recognized.

The present invention has been made in view of the above problems, and an object of the present invention is to provide (i) a touch panel substrate which includes a plurality of electrodes provided on an identical plane surface and which is improved in uniformity of in-plane light transmittance, (ii) a method of manufacturing the touch panel substrate, and (iii) an electronic device employing the touch panel substrate.

Solution to Problem

In order to attain the above object, a touch panel substrate in accordance with an aspect of the present invention is a touch panel substrate including: a substrate; and an electrode layer provided on the substrate, the electrode layer being made up of conductor lines uniformly arranged in a net-like pattern on the substrate, the conductor lines being divided into pieces so that the pieces of the conductor lines constitute a respective plurality of electrodes, at least one of a pair of ends of the conductor lines, which pair of ends face each other via a dividing line along which each of the conductor lines is divided, having a wide width part which is wider than the other part of the conductor lines, when viewed from above.

In order to attain the above object, a method of manufacturing a touch panel substrate in accordance with an aspect of the present invention is a method of manufacturing a touch panel substrate including a substrate and an electrode layer provided on the substrate, the method including the steps of: uniformly forming conductor lines in a net-like pattern on a plane surface of the substrate so that the conductor lines have a wide width part at a position other than an intersection at which the conductor lines intersect each other, the wide width part being wider than the other part of the conductor lines; and forming a plurality of electrodes by dividing the conductor lines across the wide width part, the plurality of electrodes including the conductor lines arranged in the net-like pattern.

Advantageous Effects of Invention

According to an aspect of the present invention, it is possible to provide (i) a touch panel substrate which includes a plurality of electrodes provided on an identical plane surface and which is improved in uniformity of in-plane light transmittance and (ii) a method of manufacturing the touch panel substrate.

BRIEF DESCRIPTION OF DRAWINGS

FIG. 1 is a cross-sectional view illustrating an electronic device of Embodiment 1 of the present invention.

FIG. 3 is a plan view illustrating another example configuration of the first electrode layer of the touch panel substrate of Embodiment 1.

FIG. 5 is a plan view illustrating a configuration of the touch panel substrate of Embodiment 1 which configuration is observed when the first electrode layer is superimposed over the second electrode layer.

FIG. 10 is a plan view illustrating part of the first electrode layer for explanation of a size of a wide width part of the touch panel substrate of Embodiment 1.

FIG. 23 is a plan view illustrating, in detail, the configuration of the first electrode layer of the touch panel substrate of Embodiment 4.

FIG. 28 is a plan view illustrating, in detail, the configuration of the electrode layer of the touch panel substrate of Embodiment 5.

DESCRIPTION OF EMBODIMENTS

[Embodiment 1]

Figure 2:
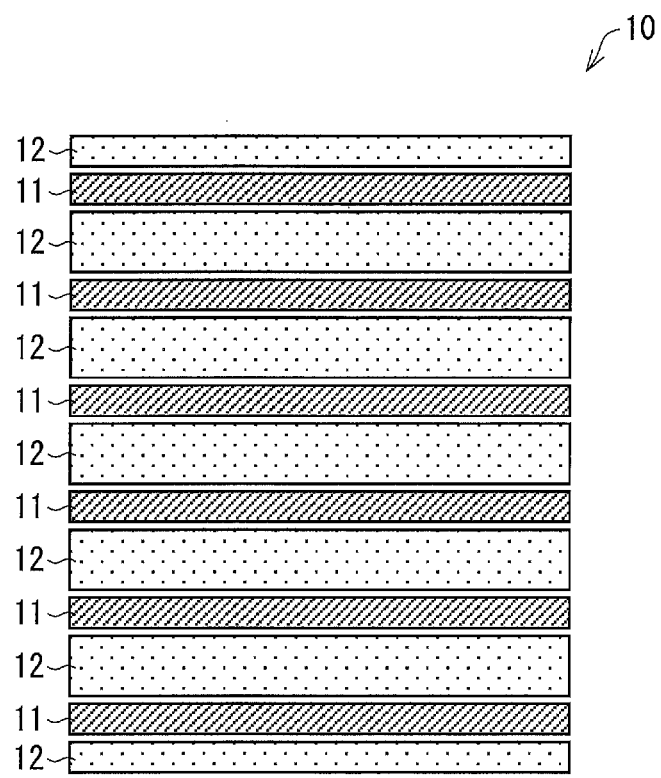
FIG. 2 is a plan view illustrating a configuration of a first electrode layer of a touch panel substrate of Embodiment 1.

The following description will discuss Embodiment 1 of the present invention with reference to FIGS. 1 through 12.

FIG. 1 is a cross-sectional view illustrating an electronic device 1 of Embodiment 1. As illustrated in FIG. 1, the electronic device 1 includes a touch panel substrate 2 and a display device 3.

As the display device 3, various display devices, such as a liquid crystal display device and an organic EL display device, can be employed. The display device 3 includes a display panel 4 and a backlight 5 which is provided on a back surface side of the display panel 4 (on a side opposite to a display surface) and which irradiates the display panel 4 with light. The display device 3 further includes various driving circuits (not illustrated) for controlling an image to be displayed on the display surface of the display panel 4.

As the display panel 4, for example, an active matrix type liquid crystal display panel can be employed in which a liquid crystal layer is sandwiched between an active matrix substrate and a color filter substrate.

<Touch Panel Substrate>

The touch panel substrate 2 is a capacitance type touch panel substrate provided on a display surface side of the display panel 4 (on a user side). The touch panel substrate 2 includes a substrate 6, a first electrode layer 10, a second electrode layer 20, a first protection layer 8, and a second protection layer 7. The first electrode layer 10 is provided on a surface of the substrate 6 which surface is located on a front surface side. The second electrode layer 20 is provided on a surface of the substrate 6 which surface is located on the back surface side. That is, the first electrode layer 10 and the second electrode layer 20 are provided so as to face each other via the substrate 6.

The substrate 6 is made of a dielectric material. For example, the substrate 6 can be made of glass, a plastic film, or the like.

The first protection layer 8 is provided on the front surface side of the first electrode layer 10. The second protection layer 7 is provided on the back surface side of the second electrode layer 20.

The first protection layer 8 has a surface with which a detection target is in contact, and can be made of a light transmissive insulator such as glass or a plastic film. Similarly, the second protection layer 7 can be made of a light transmissive insulator such as glass or a plastic film. For example, the second protection layer 7 can be adhered to the display panel 4.

<Electrode Layer>

Configurations of the first electrode layer 10 and the second electrode layer 20 of the touch panel substrate 2 of Embodiment 1 will be described below in detail. The touch panel substrate 2 has such a structure that the first electrode layer 10 is superimposed over the second electrode layer 20 when viewed from above.

Figure 4:
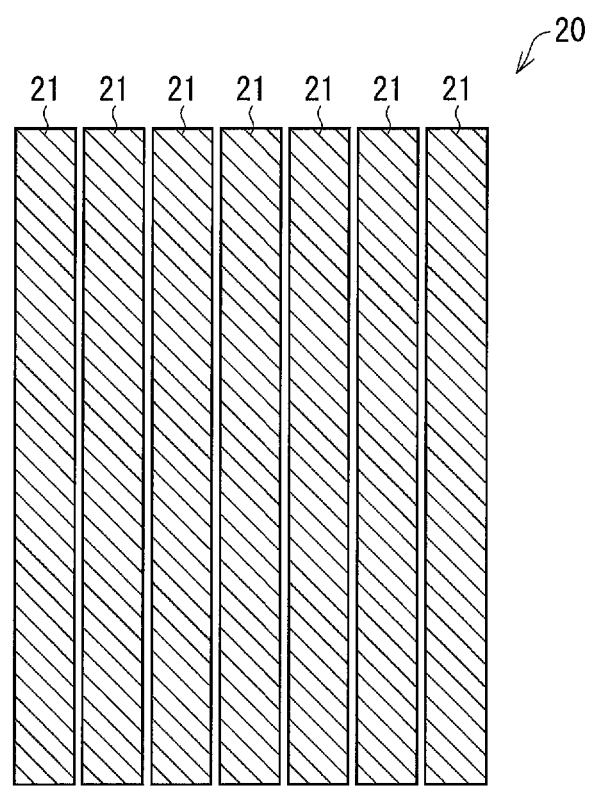
FIG. 4 is a plan view illustrating a configuration of a second electrode layer of the touch panel substrate of Embodiment 1.

FIG. 2 is a plan view illustrating a configuration of the first electrode layer 10 of the touch panel substrate 2 of Embodiment 1. FIG. 3 is a plan view illustrating a configuration of a first electrode layer 10', which is another example of the first electrode layer 10 of the touch panel substrate of Embodiment 1. FIG. 4 is a plan view illustrating a configuration of the second electrode layer 20 of the touch panel substrate of Embodiment 1.

As illustrating in FIG. 2, the first electrode layer 10 has a plurality of electrodes for a first sensor (hereinafter, referred to as first sensor electrodes 11) which electrodes extend in a lateral direction in FIG. 2. Dummy electrodes 12 are provided between respective adjacent ones of the first sensor electrodes 11 (touch sensor electrodes). Each of the first sensor electrodes 11 has a strip shape. Similarly, each of the dummy electrodes 12 has a strip shape.

Note here that each of the dummy electrodes 12 indicates an electrode other than an electrode for a touch sensor (touch sensor electrode).

Note that, as the first electrode layer of Embodiment 1, the first electrode layer 10' illustrated in FIG. 3 can be, for example, employed. Each shape of dummy electrodes 12' of the first electrode layer 10' is different from each shape of the dummy electrodes 12 of the first electrode layer 10 illustrated in FIG. 2. Specifically, each of the dummy electrodes 12' has such a shape that each of the dummy electrodes 12 is further divided in a longitudinal direction in FIG. 3. This causes each width of the dummy electrodes 12' to be equal to each width of electrodes for a second sensor (later described).

As illustrated in FIG. 4, the second electrode layer 20 has a plurality of electrodes for the second sensor (hereinafter, referred to as second sensor electrodes 21) which electrodes extend in a longitudinal direction in FIG. 4. Each of the second sensor electrodes 21 (touch sensor electrodes) has a strip shape.

Figure 6:
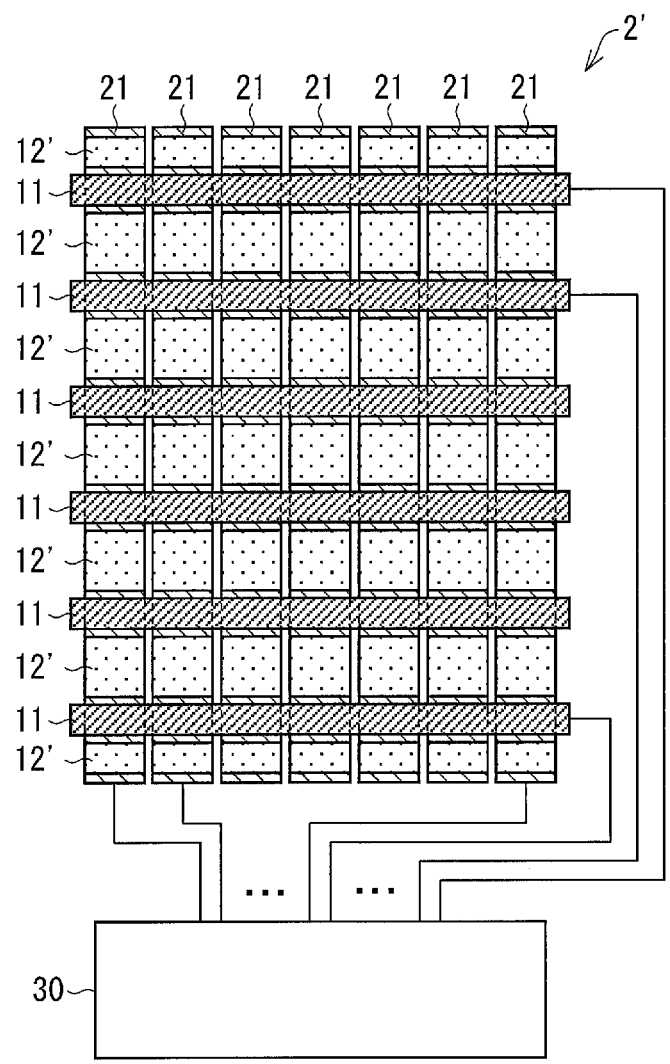
FIG. 6 is a plan view illustrating another example configuration of the touch panel substrate of Embodiment 1 which configuration is observed when the first electrode layer is superimposed over the second electrode layer.

FIG. 5 is a plan view illustrating a configuration of the touch panel substrate 2 of Embodiment 1 which configuration is observed when the first electrode layer 10 is superimposed over the second electrode layer 20. FIG. 6 is a plan view illustrating another example configuration of the touch panel substrate 2 of Embodiment 1 which configuration is observed when the first electrode layer 10' is superimposed over the second electrode layer 20.

As illustrated in FIGS. 5 and 6, the touch panel substrate 2 has such a structure that the first electrode layer 10 is superimposed over the second electrode layer 20 via the substrate 6 so that the first sensor electrodes 11 intersect the second sensor electrodes 21 when viewed from above. Note that each of the first sensor electrodes 11 is connected to a position detecting circuit 30. Similarly, each of the second sensor electrodes 21 is connected to the position detecting circuit 30.

The touch panel substrate 2 of Embodiment 1 thus includes the first sensor electrodes 11 and the second sensor electrodes 21 arranged in a simple matrix pattern.

Capacitances are formed between the first sensor electrodes 11 and the second sensor electrodes 21. In a case where a detection target such as a human's finger is brought into contact with a surface of the touch panel substrate 2, a change occurs in value of a capacitance. By the position detecting circuit 30 detecting the change in value of the capacitance, it is possible to specify a contact position where the detection target is in contact with the surface (the first protection layer 8) of the touch panel substrate 2.

For example, by (i) applying drive voltages to the first sensor electrodes 11 and (ii) measuring a change in voltages of the second sensor electrodes 21, a first sensor electrode 11 (row) and a second sensor electrode 21 (column) between which a value of a capacitance has changed is specified.

Note that a known circuit can be employed as the position detecting circuit 30 for detecting a position of coordinates of a detection target, and the position detecting circuit 30 is not limited any particular one.

Configurations of the first sensor electrodes 11 and the second sensor electrodes 21 of the touch panel substrate 2 of Embodiment 1 will be described below in detail.

<First Sensor Electrode>

Figure 7:
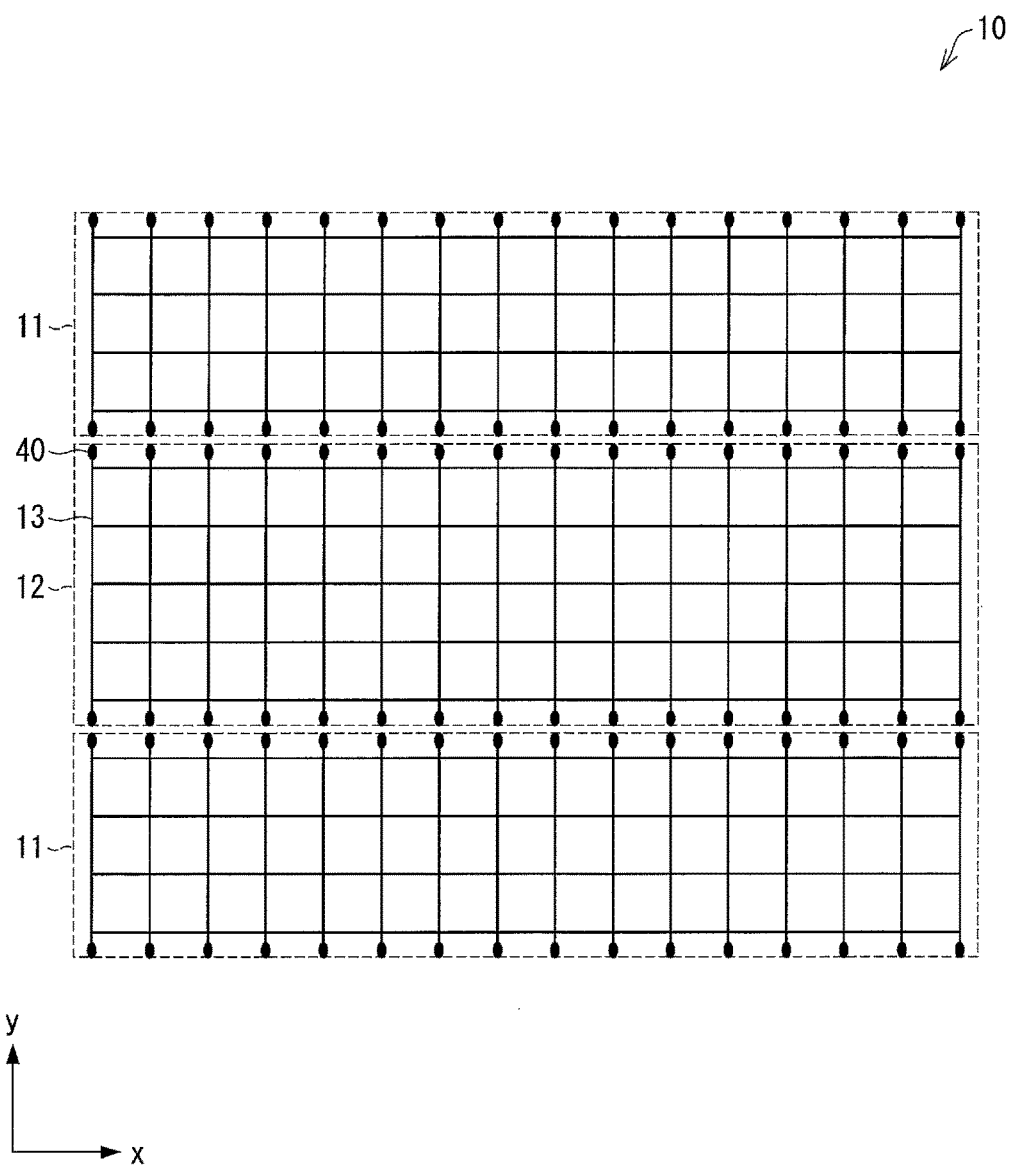
FIG. 7 is a plan view illustrating, in detail, the configuration of the first electrode layer of the touch panel substrate of Embodiment 1.

FIG. 7 is a plan view illustrating, in detail, the configuration of the first electrode layer 10 of Embodiment 1.

As illustrated in FIG. 7 with the use of broken lines, the first sensor electrodes 11, each including first conductor lines 13 arranged on an identical plane surface in a net-like pattern, and the dummy electrodes 12, each including first conductor lines 13 arranged on an identical plane surface in a net-like pattern, are arranged in the first electrode layer 10. That is, the conductor lines 13 constitute each of the first sensor electrodes 11 or the dummy electrodes 12.

The first conductor lines 13 included in one first sensor electrode 11 are electrically insulated from the first conductor lines 13 included in another first sensor electrode 11.

Further, as illustrated in FIG. 7 with the use of the broken lines, an outer edge of the first sensor electrode 11 has a rectangular shape. A shape (side) of part of the outer edge of the first sensor electrode 11, which part faces another adjacent first sensor electrode 11, is defined by ends of the first conductor lines 13.

As illustrated in FIG. 7, the ends of the first conductor lines 13, which ends define the shape of the outer edge of the first sensor electrode 11, have respective wide width parts 40 each of which is wider than the other part of the first conductor lines 13. That is, assuming that a width of part, other than the wide width parts 40, of the first conductor lines 13 is represented by d1, a width d2 of each of the wide width parts 40 is greater than d1, when viewed from above.

Note that the wide width parts 40 are provided so as not to overlap intersections of the first conductor lines 13.

Each of the first conductor lines 13 is preferably made of a material, such as metal, which has lower electric resistance. Note that numberless first conductor lines 13 are actually formed in the first sensor electrode 11 or the dummy electrode 12. However, in FIG. 7, such numberless first conductor lines 13 are simplified for convenience.

Note also that the first conductor lines 13 arranged in a net-like pattern are not necessary to have a square grid shape, and can be alternatively arranged so as to have a parallelogram grid shape.

<Second Sensor Electrode>

Figure 8:
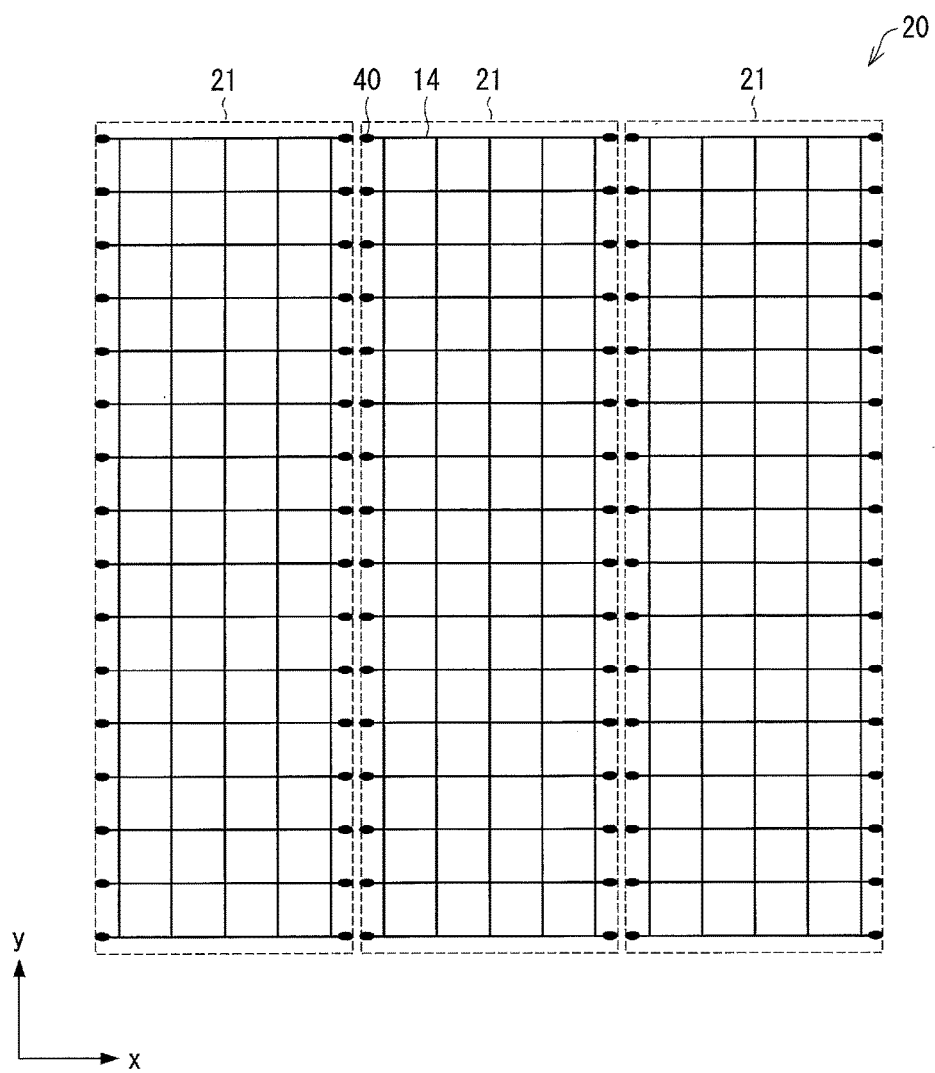
FIG. 8 is a plan view illustrating, in detail, the configuration of the second electrode layer of the touch panel substrate of Embodiment 1.

FIG. 8 is a plan view illustrating, in detail, the configuration of the second electrode layer 20 of Embodiment 1.

As illustrated in FIG. 8 with the use of broken lines, the second sensor electrodes 21, each including second conductor lines 14 arranged on an identical plane surface in a net-like pattern, are arranged in the second electrode layer 20. That is, the second conductor lines 14 constitute each of the second sensor electrodes 21.

The second conductor lines 14 included in one second sensor electrode 21 are electrically insulated from the second conductor lines 14 included in another second sensor electrode 21.

Further, as illustrated in FIG. 8 with the use of the broken lines, an outer edge of the second sensor electrode 21 has a rectangular shape. A shape (side) of part of the outer edge of the second sensor electrode 21, which part faces another adjacent second sensor electrode 21, is defined by ends of the second conductor lines 14.

As illustrated in FIG. 8, the ends of the second conductor lines 14, which ends define the shape of the outer edge of the second sensor electrode 21, have respective wide width parts 40 each of which is wider than the other part of the second conductor lines 14. That is, assuming that a width of part, other than the wide width parts 40, of the second conductor lines 14 is represented by d1, a width d2 of each of the wide width parts 40 is greater than d1, when viewed from above.

Note that the wide width parts 40 are provided so as not to overlap intersections of the second conductor lines 14.

Each of the second conductor lines 14 is preferably made of a material, such as metal, which has lower electric resistance. Note that numberless second conductor lines 14 are actually formed in the second sensor electrode 21. However, in FIG. 8, such numberless second conductor lines 14 are simplified for convenience.

Note also that the second conductor lines 14 arranged in a net-like pattern are not necessary to have a square grid shape, and can be alternatively arranged so as to have a parallelogram grid shape.

<Transmittance Uniformity>

Light transmittance of the touch panel substrate 2 of the present invention will be described below.

Figure 9:
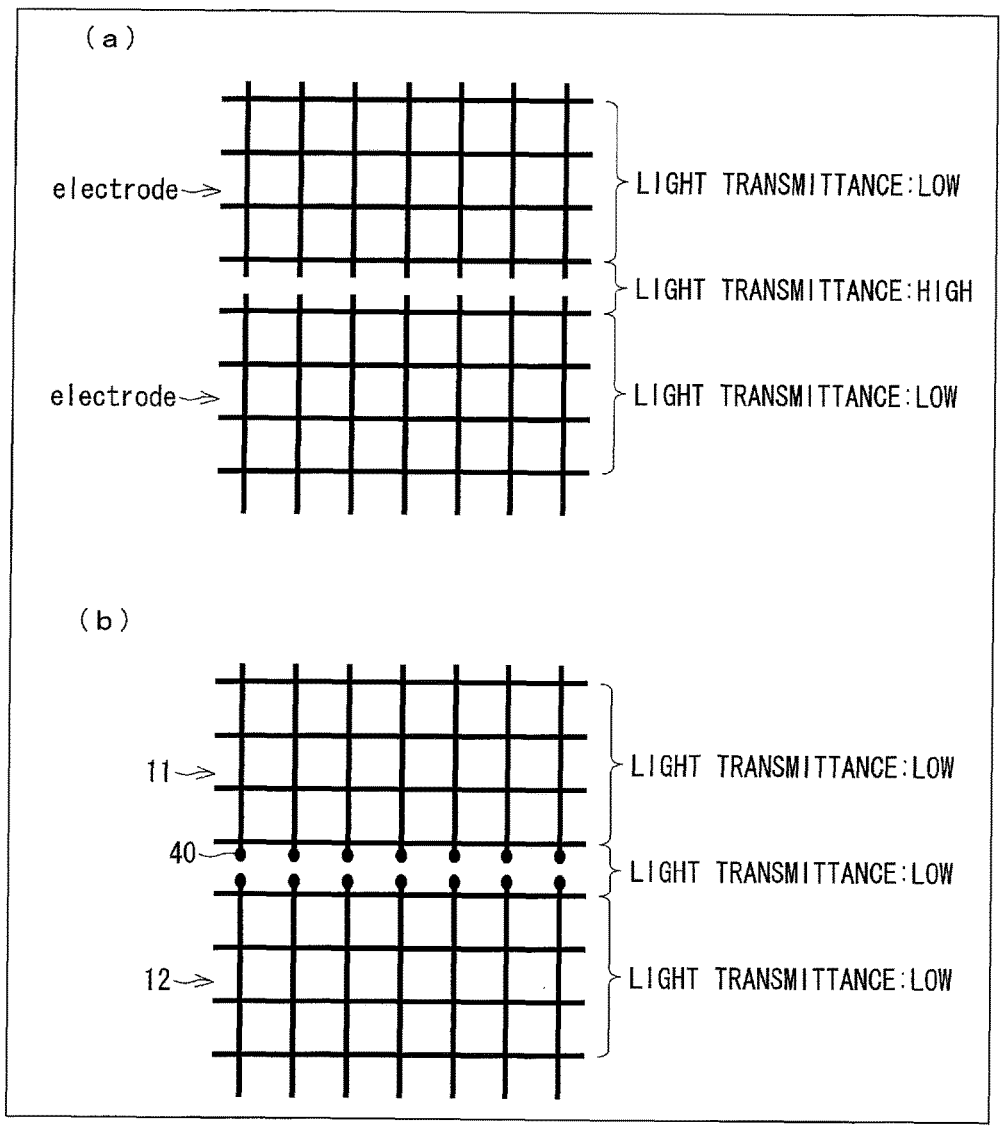
FIG. 9 is a view for explaining light transmittance of the touch panel substrate of Embodiment 1. (a) of FIG. 9 is a plan view illustrating part of an electrode layer of a conventional touch pane substrate. (b) of FIG. 9 is a plan view illustrating part of the first electrode layer of Embodiment 1.

FIG. 9 is a view for explaining light transmittance of the touch panel substrate 2 of the present invention. (a) of FIG. 9 is a plan view illustrating part of an electrode layer of a conventional touch panel substrate. (b) of FIG. 9 is a plane view illustrating part of the first electrode layer 10 of Embodiment 1.

An opaque conductor line is often used as each of the first conductor lines 13 so that electric resistance is low. In this case, light that enters the first electrode layer 10 is blocked by the first conductor lines 13. Therefore, the light passes through part of the first electrode layer 10 in which part no first conductor line 13 is provided.

In an electrode layer of a touch panel substrate, conductor lines constituting an electrode is separated from those constituting another electrode so that the conductor lines constituting the electrode are electrically insulated from those constituting the another electrode, and a region between adjacent electrodes is a space where no conductor line is provided. This partially causes an increase in aperture ratio of the conductor lines. Therefore, as illustrated in (a) of FIG. 9, such a conventional touch panel substrate has varying light transmittance between a vicinity of the center of the electrode and a vicinity of an end of the electrode, when viewed from above. More specifically, the vicinity of the end of the electrode is higher in light transmittance than the vicinity of the center of the electrode.

With this configuration, according to an electronic device made up of the conventional touch panel substrate and a display device, in a case where a user of the electronic device looks at an image displayed by the display device, a brightness difference occurs due to a variation in light transmittance and, accordingly, a pattern corresponding to the end of the electrode or a pattern corresponding to the region between the adjacent electrodes is visually recognized. This results in a deterioration of display quality (display performance) of such a displayed image.

In contrast, according to the first electrode layer 10 of Embodiment 1, the shape of the outer edge of the first sensor electrode 11 or the dummy electrode 12 is defined by the ends of the first conductor lines 13, and the ends of the first conductor lines 13 have the respective wide width parts 40.

This causes an end of the first sensor electrode 11 to be lower in light transmittance than a vicinity of the center of the first sensor electrode 11. Similarly, an end of the dummy electrode 12 is lower in light transmittance than a vicinity of the center of the dummy electrode 12.

Since no conductor line is provided in a region (space) between the first sensor electrode 11 and the dummy electrode 12, the region is high in light transmittance. However, as described above, the end of the first sensor electrode 11 and the end of the dummy electrode 12 are each low in light transmittance.

Therefore, in a case where the end of the first sensor electrode 11, the space, and the end of the dummy electrode 12 are regarded as a boundary region, high light transmittance of the space and low light transmittance of the ends of the first sensor electrode 11 and the dummy electrode 12 are cancelled out in the boundary region.

This allows a variation in light transmittance to be reduced and small between (i) the boundary region and (ii) the vicinity of the center of the first sensor electrode 11 and the vicinity of the center of the dummy electrode 12. That is, it is possible to suppress, as a whole, ununiformity of the light transmittance of the first electrode layer 10. The same applies to the second electrode layer 20.

It is thus possible to improve uniformity of transmittance for light that travels in a direction perpendicular to the first electrode layer 10 and the second electrode layer 20. Therefore, according to the electronic device 1 made up of the touch panel substrate 2 and the display device 3, in a case where a user of the electronic device 1 looks at an image displayed by the display device 3, it is possible to cause a difference in brightness, between (i) a vicinity of the region between the electrodes and (ii) the vicinity of the center of the electrode, to be at or below a limit above which a human can recognizes the difference.

That is, it is possible to cause a pattern, corresponding to the end of the first sensor electrode 11 or the dummy electrode 12, or a pattern, corresponding to the region between the first sensor electrode 11 and the dummy electrode 12, not to be easily recognized visually, and possible to suppress a deterioration of display quality of a displayed image.

<Wide Width Part>

Here, a size of each of the wide width parts 40 which size is preferable for the touch panel substrate 2 of Embodiment 1 will be described below. FIG. 10 is a plan view illustrating part of the first electrode layer 10 for explanation of the size of each of the wide width parts 40.

A human recognizes a brightness difference as a pattern by sensing the brightness difference with his/her eyes. In general, resolution of a human eye is between 70 μm and 80 μm. However, even in a case where an object has a size of not more than 70 μm, a human is capable of visually recognizing the object when a difference, between (i) brightness in a visual field of the human and (ii) average brightness around the object, is a given level or more.

In a case where the ends of the conductor lines have the respective wide width parts 40 as in the touch panel substrate 2 of Embodiment 1, a region where the wide width parts 40 are provided is low in light transmittance. Namely, the wide width parts 40 themselves cause ununiformity of the light transmittance. This results in that a brightness difference occurs between (i) the region where the wide width parts 40 are provided and (ii) a region where no wide width part 40 is provided.

In this case, in a case where the brightness difference is a given level or more, the brightness difference is sensed by the eyes of the user of the electronic device 1 including the touch panel substrate 2, and the wide width parts 40 may be recognized as a pattern.

In view of this, each of the wide width parts 40 preferably has a size in such a range that a brightness difference is not sensed by the eyes of the user and the wide width parts 40 are not recognized as a pattern.

In regard to the touch panel substrate 2 of Embodiment 1, a brightness difference corresponds to an aperture ratio, and the aperture ratio is based on a ratio of (i) an area of the region where no conductor line is provided to (ii) an area of the whole region of the electrode layer.

Here, an aperture ratio of the region of the electrode layer in which region no wide width part 40 is provided is expressed by the following Expression:

$$(a^2-2ad)/a^2 \quad \text{Expression (1)}$$

where, when viewed from above, "a" denotes a conductor line pitch indicative of an interval between adjacent ones of the conductor lines, and "d" denotes a conductor line width indicative of a width of each of the conductor lines (see FIG. 10).

Further, an aperture ratio of the boundary region (the region where the wide width parts 40 are provided) is expressed by the following Expression:

$$(a^2-2ad-2S)/a^2 \quad \text{Expression (2)}$$

where, when viewed from above, "S" denotes an area of each of the wide width parts 40.

A range of the area "S" of each of the wide width parts 40 is calculated in which range a brightness difference (contrast difference), between (i) brightness based on the aperture ratio expressed by the Expression (1) and (ii) brightness based on the aperture ratio expressed by the Expression (2), is not sensed and is not recognized as a pattern.

Contrast sensitivity is expressed with the use of a maximum value (Max) and a minimum value (Min) of brightness. That is, the contrast sensitivity is expressed by (Max+Min)/(Max−Min).

Here, in a case where the contrast sensitivity is replaced with a difference between the aperture ratios by replacing (i) Max with $(a^2-2ad)/a^2$ and (ii) Min with $(a^2-2ad-2S)/a^2$, the contrast sensitivity is expressed by $\{a(a-2d)-S\}/S$.

The inventors of the present invention conducted a visual experiment so as to verify an upper limit of the area "S" of each of the wide width parts 40 to which upper limit each of the wide width parts 40 is not visually recognized as a pattern on the touch panel substrate 2 of Embodiment 1.

Figure 11:
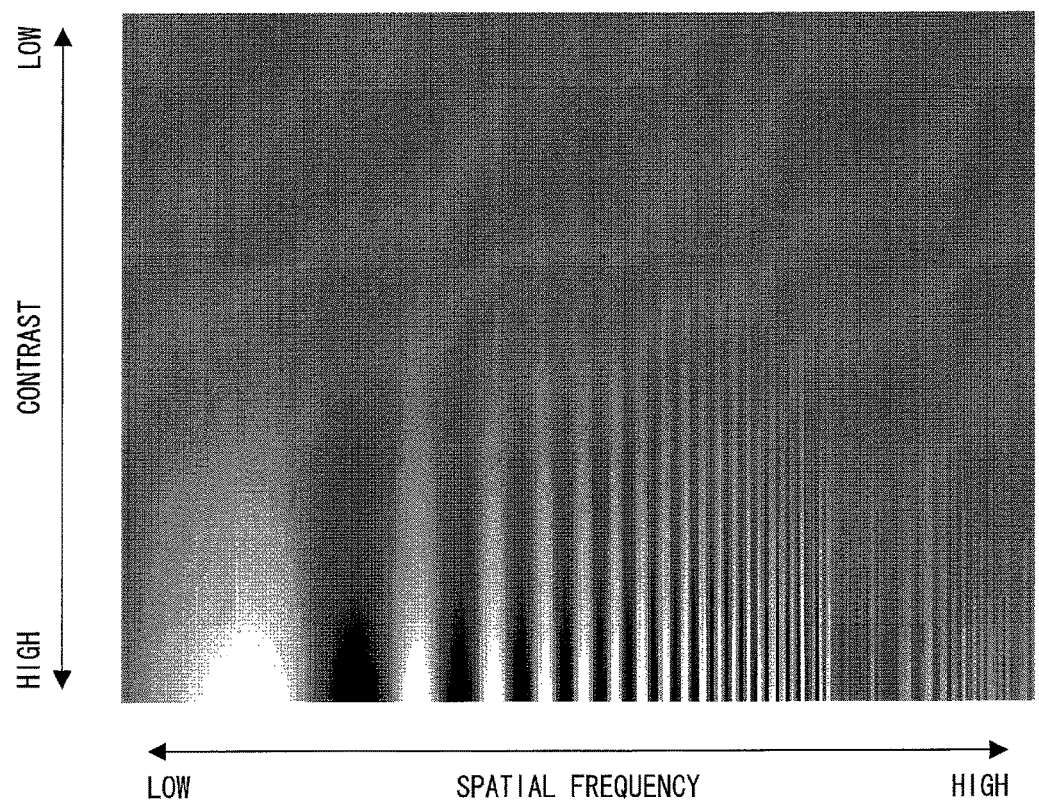
FIG. 11 is a Campbell chart used in a visual experiment.

FIG. 11 is a Campbell chart used in the visual experiment.

In the Campbell chart of FIG. 11, a stripe pattern is shown which is obtained by changing a spatial frequency along a horizontal axis and changing contrast along a vertical axis.

The Campbell chart of FIG. 11 was viewed from the front thereof from a distance of 50 cm, and contrast visible at each spatial frequency is visually measured. Such visual measurement is carried out at spatial frequencies in a range of 0.5 cpd to 30 cpd (cycles/degree), in consideration of a size of a general sensor electrode, a conductor line pitch, and the like.

As a result, an allowable limit to which the stripe pattern is not visually recognized is 134 by the contrast sensitivity. Note that, at spatial frequencies outside the range of 0.5 cpd to 30 cpd, the contrast sensitivity corresponding to the allowable limit is lower than 134. Therefore, in a case where the contrast sensitivity is not less than 134, the stripe pattern is not visually recognized and visually allowed.

Thus, in a case where $\{a(a-2d)-S\}/S \geq 134$, the wide width parts 40 are not visually recognized on the touch panel substrate 2 of Embodiment 1.

That is, the area "S" of each of the wide width parts 40 with which area the each of the wide width parts 40 is not visually recognized is $S \leq a(a-2d)/135$.

Moreover, a width W of each of the wide width parts 40 is more preferably not more than 50 μm when viewed from above. This allows the wide width parts 40 not to be easily recognized visually.

In view of the above, according to the first electrode layer 10 and the second electrode layer 20 of Embodiment 1, the conductor line pitch is set to 500 μm, the conductor line width is set to 10 μm, and each of the wide width parts 40 is set to have a shape of an ellipse having a major axis of 50 μm and a minor axis of 40 μm.

Further, each of the intersections of the first conductor lines 13 may be wider than the other part of the first conductor lines 13. Therefore, in a case where the wide width parts 40 are close to the intersections of the first conductor lines 13, the light transmittance is excessively low in the first sensor electrode 11, the dummy electrode 12, and the boundary region. This may cause the boundary region to be visually recognized.

In view of the above, by setting, to not less than 100 μm, a distance "k" between a wide width part 40 and an intersection of the first conductor lines 13, it is possible to prevent a boundary, between the first sensor electrode 11 and the dummy electrode 12, from being visually recognized.

In a case where a gap is too wide between the wide width parts 40 of the first sensor electrode 11 and the wide width parts 40 of the dummy electrode 12 which wide width part 40 face the wide width parts 40 of the first sensor electrode 11, the light transmittance is high, so that the gap is recognized as a shape. Therefore, the gap, between the wide width parts 40 of the first sensor electrode 11 and wide width parts 40 of the dummy electrode 12 (between the first sensor electrode 11 and the dummy electrode 12), is preferably not more than 150 μm so that the gap is not recognized as a shape.

Note, however, that the gap needs to be set to such a degree that a short circuit does occur between the first sensor electrode 11 and the dummy electrode 12.

<Shape of Wide Width Part>

Figure 12:
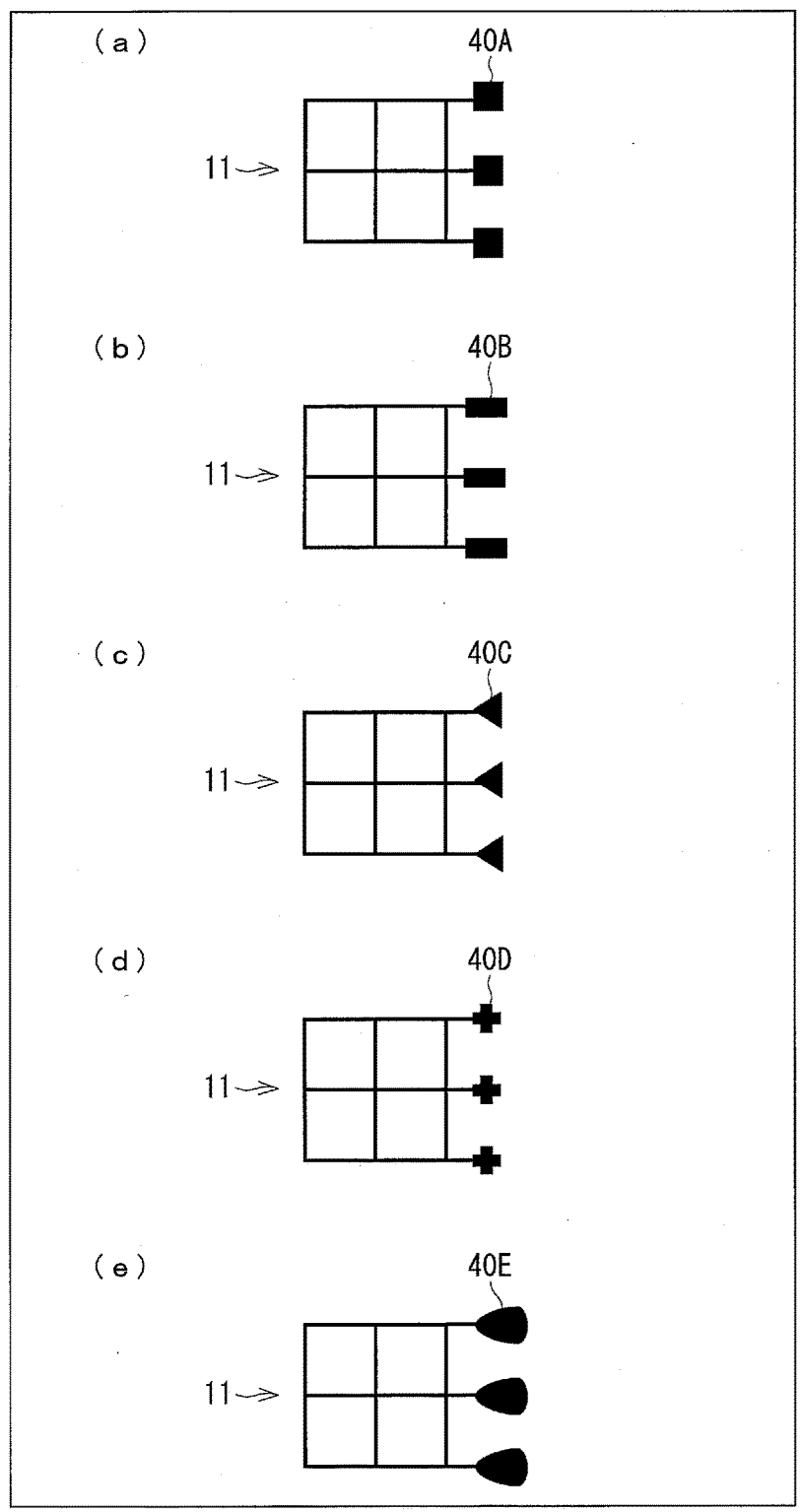
FIG. 12 is a plan view illustrating part of the first sensor electrode for illustrating another example shape of the wide width part of the touch panel substrate of Embodiment 1.

FIG. 12 is a plan view illustrating part of the first sensor electrode 11 for illustrating another example shape of each of the wide width parts 40. The description, such that each of the wide width parts 40 has a shape of an ellipse, has been given above. However, each shape of the wide width parts 40 is not limited to the elliptic.

Like a first sensor electrode 11A illustrated in (a) of FIG. 12, wide width parts 40a can be, for example, provided each of which has a 35-µm-square shape. Like a first sensor electrode 11B illustrated in (b) of FIG. 12, wide width parts 40b can be, for example, provided each of which has a rectangular shape measuring 40 µm×25 µm. Like a first sensor electrode 11C illustrated in (c) of FIG. 12, wide width parts 40c can be provided each of which has a triangular shape. Like a first sensor electrode 11D illustrated in (d) of FIG. 12, wide width parts 40d can be provided each of which has a cross shape. Like a first sensor electrode 11E illustrated in (e) of FIG. 12, wide width parts 40e can be provided each of which has a semielliptic shape. Alternatively, a parallelogram shape, a rhombic shape, or the like can be employed as a shape of each of the wide width parts.

Similarly, each of the dummy electrode 12 and the second sensor electrode 21 can alternatively have the wide width parts 40a illustrated in (a) of FIG. 12, the wide width parts 40b illustrated in (b) of FIG. 12, the wide width parts 40c illustrated in (c) of FIG. 12, the wide width parts 40d illustrated in (d) of FIG. 12, or the wide width parts 40e illustrated in (e) of FIG. 12.

Even with the above configuration, the electronic device 1 made up of the touch panel substrate 2 and the display device 3 is capable of (i) causing a pattern (bright line) corresponding to the region between the electrodes not to be easily recognized visually by a viewer of an image displayed by the display device 3 and (ii) suppressing a deterioration of display quality of such a displayed image.

[Embodiment 2]

Figure 13:
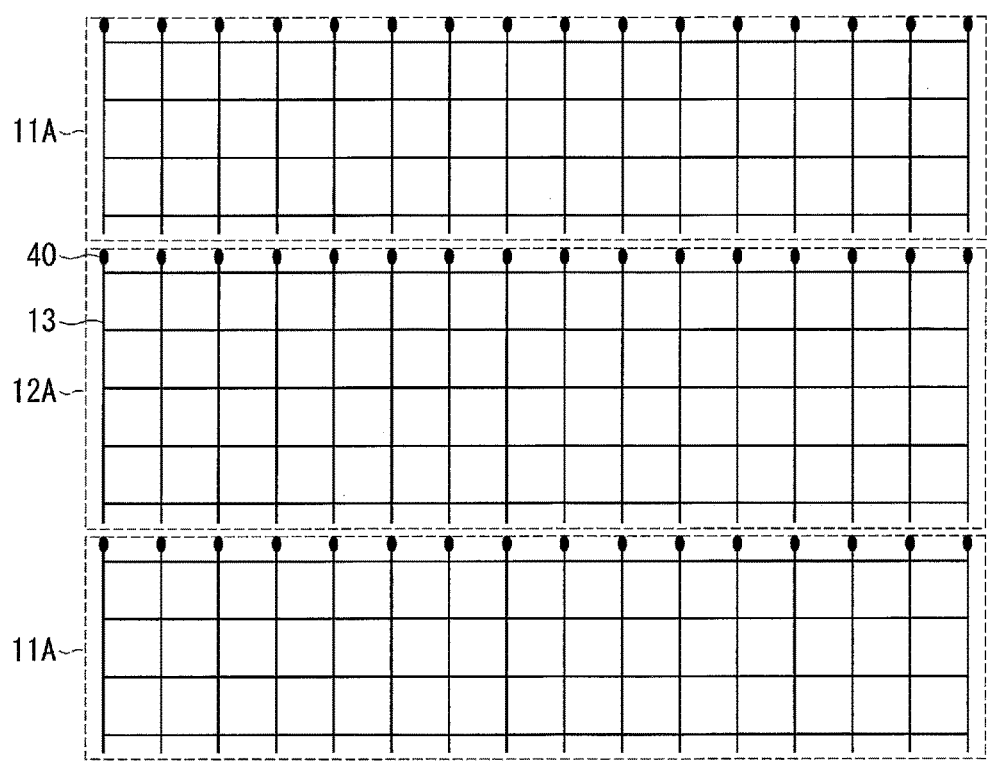
FIG. 13 is a plan view illustrating, in detail, a configuration of a first electrode layer of a touch panel substrate of Embodiment 2.
Figure 14:
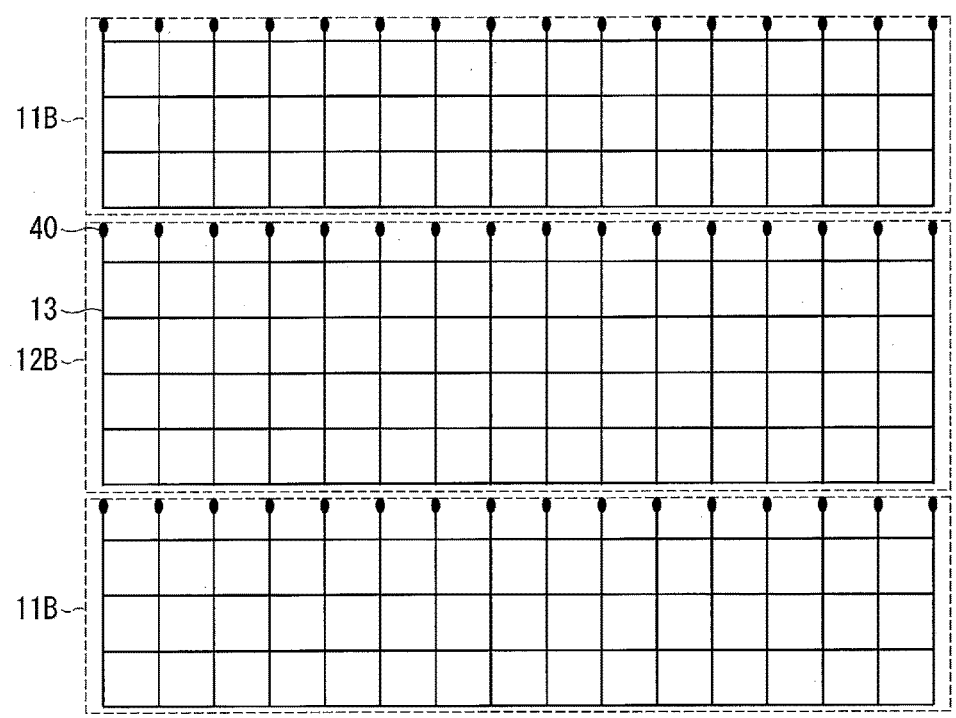
FIG. 14 is a plan view illustrating, in detail, another example configuration of the first electrode layer of the touch panel substrate of Embodiment 2.

The following description will discuss another embodiment of the present invention with reference to FIGS. 13 and 14. Note that, for convenience, identical reference numerals will be given to respective members having functions identical to those of the members described in Embodiment 1, and descriptions of the members will be omitted.

FIG. 13 is a plan view illustrating, in detail, a configuration of a first electrode layer of Embodiment 2.

According to a first electrode layer of the present invention, each electrode which has an outer edge having a rectangular shape is only necessary to be configured such that ends of first conductor lines 13, which ends define any one of sides of the electrode which sides face respective adjacent electrodes, have respective wide width parts 40.

As illustrated in FIG. 13, each electrode included in the first electrode layer of Embodiment 2 is configured such that ends of first conductor lines 13, which ends define one of two sides of the each electrode which sides face respective adjacent electrodes, have respective wide width parts 40.

Even with the above configuration, an electronic device 1 made up of a touch panel substrate 2 and a display device 3 is capable of (i) causing a pattern (bright line) corresponding to a region between adjacent electrodes not to be easily recognized visually by a viewer of an image displayed by the display device 3 and (ii) suppressing a deterioration of display quality of such a displayed image.

FIG. 14 is a plan view illustrating, in detail, another example configuration of the first electrode layer of Embodiment 2. As illustrated in FIG. 14, each electrode, which has an outer edge having a rectangular shape, is only necessary to be configured such that ends of first conductor lines 13 define one of two sides of the electrode which sides face respective adjacent electrodes. It is not necessary that the other of the two sides be defined by ends of the first conductor lines 13.

Even with the above configuration, an electronic device 1 made up of a touch panel substrate 2 and a display device 3 is capable of (i) causing a pattern (bright line) corresponding to a region between adjacent electrodes not to be easily recognized visually by a viewer of an image displayed by the display device and (ii) suppressing a deterioration of display quality of such a displayed image. The same applies to a second electrode layer 20.

<Method of Forming Electrode Layer>

Figure 15:
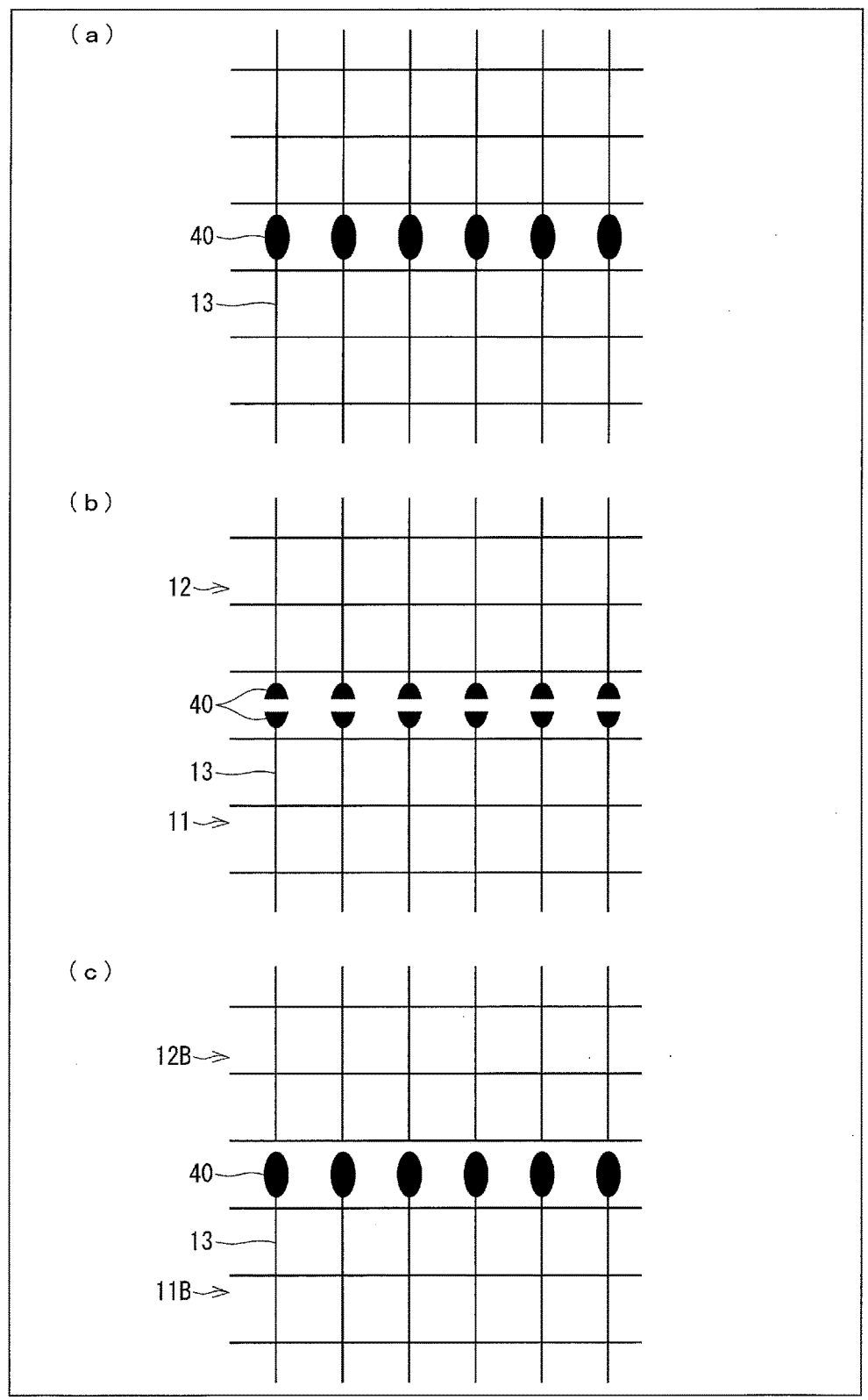
FIG. 15 is a plan view illustrating part of a step of forming the first electrode layer of the touch panel substrate of Embodiment 1 or Embodiment 2.

A method of manufacturing a touch panel substrate 2 of Embodiment 1 or 2 will be described below. The method of manufacturing the touch panel substrate 2 includes a step of forming a first electrode layer 10. FIG. 15 is a plan view illustrating part of the step of forming the first electrode layer 10.

The step of forming the first electrode layer 10 of Embodiment 1 or 2 can include the following step.

That is, first, first conductor lines 13, uniformly arranged in a net-like pattern on an entire surface of the first electrode layer 10, are arranged so as to partially have wide width parts 40 (see (a) of FIG. 15). In this case, the wide width parts 40 are provided in a row in a direction parallel to a direction in which first sensor electrodes 11 and dummy electrodes 12 are to extend. Note that the wide width parts 40 are preferably provided at respective positions other than intersections at which the first conductor lines 13 intersect each other.

Next, the first conductor lines 13 are divided (cut) across the wide width parts 40 along an electrode shape (see (b) of FIG. 15). This causes a plurality of electrodes for a touch sensor to be formed.

By use of a simple method, that is, by dividing the first conductor lines 13 across the wide width parts 40, it is possible to form the first sensor electrodes 11 or the dummy electrodes 12, and possible to cause pairs of ends of the first conductor lines 13, each of which pairs face each other via a dividing line along which the first conductor lines 13 are divided, to have the respective wide width parts 40.

By carrying out the above step, it is possible to form the first sensor electrodes 11 and the dummy electrodes 12 of Embodiment 1 and, accordingly, possible to form the first electrode layer 10 of Embodiment 1.

Note that, when the first conductor lines 13 are divided, the first conductor lines 13 can be alternatively divided so that the dividing line passes by ends of the wide width parts 40 as illustrated in (c) of FIG. 15. This makes it possible to form electrodes corresponding to first sensor electrodes 11B and dummy electrodes 12B, illustrated in FIG. 14, of Embodiment 2 and, accordingly, possible to form the first electrode layer 10.

By carrying out a similar method, it is also possible to form the second electrode layer 20.

Note that the method of manufacturing the touch panel substrate 2 of Embodiment 1 or 2 is not always necessary to include the step of dividing the conductor lines which are arranged in advance so as to partially have the wide width parts, as described above. The method can alternatively include (i) a step of dividing conductor line patterns having no wide width part 40 and (ii) a step of providing, as auxiliary shapes, the wide width parts 40 to portions of the conductor line patterns across which portions the conductor line patterns are divided.

Note, however, that such a method of separately providing, as additional structures, the wide width parts 40 to the portions (space) of the conductor lines, across which portions the conductor lines are divided, is difficult in terms of a manufacturing technique because the space is narrow.

According to such a structure that a conductor line pitch is narrow, this may cause the conductor line patterns to be ununiform.

On the other hand, by causing the ends of the first conductor lines 13, which ends are obtained by dividing the first conductor lines 13, to have the wide width parts 40 so as to form the first electrode layer 10, as illustrated in FIG. 15, it is possible to form the first electrode layer 10, having uniform conductor line patterns, without expanding the space. Such a way to form the first electrode layer 10 is applicable to conductor line patterns in which a conductor line pitch is narrow, and is favorable to maintain uniformity of the conductor line patterns.

Another method of manufacturing a touch panel substrate 2 of Embodiment 1 or 2 will be described below. The method of manufacturing the touch panel substrate 2 can include the following step so as to form a first electrode layer 10.

First, a thin film metal layer is formed uniformly on a substrate. As metal, for example, copper can be used.

Next, the metal layer is subjected to photolithography with the use of a mask, which is patterned after a net-like pattern having wide width parts and after shapes of the first sensor electrodes 11, so that the first electrode layer 10 is formed.

Specifically, the photolithography can be carried out as follows. First, a positive photoresist is, for example, applied on the metal layer. Next, the metal layer, on which the positive photoresist is applied, is covered with a mask having a light-blocking part which is formed in a net-like pattern having wide width parts and which is hollowed out along outer edges of electrodes, and is then exposed. Thereafter, the metal layer is subjected to etching.

With this method, conductor lines uniformly arranged on the substrate in the net-like pattern are divided in shapes of electrodes, so that a plurality of electrodes for a touch sensor are formed and, accordingly, an electrode layer including the plurality of electrodes for the touch sensor is formed.

[Embodiment 3]

The following description will discuss another embodiment of the present invention with reference to FIGS. 16 through 19. Note that, for convenience, identical reference numerals will be given to respective members having functions identical to those of the members described in the foregoing Embodiments, and descriptions of the members will be omitted.

<Electrode Layer>

Figure 16:
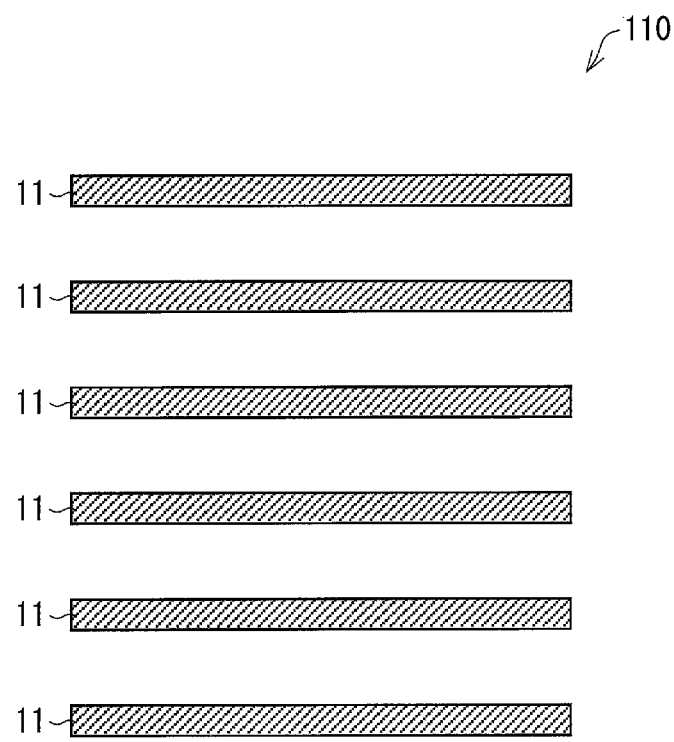
FIG. 16 is a plan view illustrating a configuration of a first electrode layer of a touch panel substrate of Embodiment 3.
Figure 17:
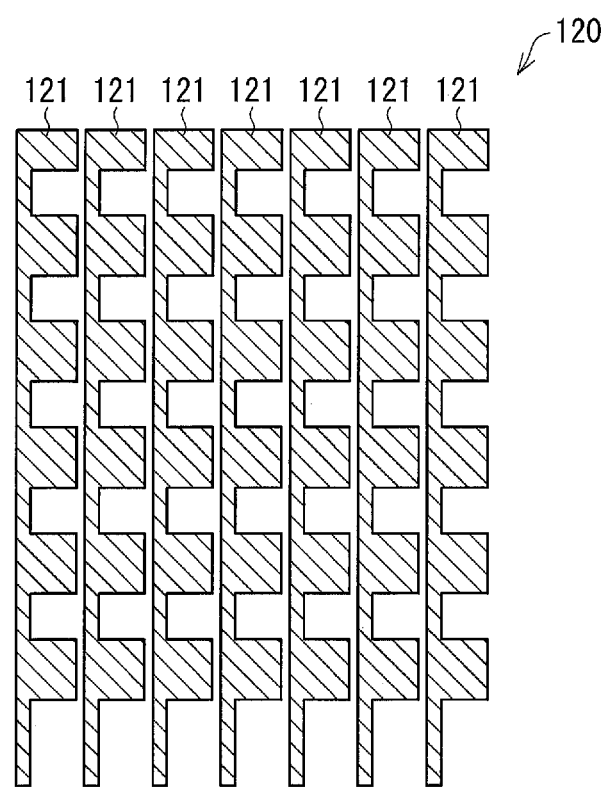
FIG. 17 is a plan view illustrating a configuration of a second electrode layer of the touch panel substrate of Embodiment 3.

FIG. 16 is a plan view illustrating a configuration of a first electrode layer 110 of a touch panel substrate 102 of Embodiment 3. FIG. 17 is a plan view illustrating a configuration of a second electrode layer 120 of the touch panel substrate 102 of Embodiment 3.

As illustrated in FIG. 16, the first electrode layer 110 of Embodiment 3 is different from the first electrode layer 10 of Embodiment 1 in that the first electrode layer 110 includes no dummy electrode.

As illustrated in FIG. 17, the second electrode layer 120 of Embodiment 3 includes second sensor electrodes 121 which are arranged at predetermined intervals so as to extend in a longitudinal direction in FIG. 17. Each of the second sensor electrodes 121 has such a shape that recesses, each having a rectangular shape, are formed in each of the second sensor electrodes 21 of Embodiment 1. An interval between adjacent ones of the recesses of each of the second sensor electrodes 121 is identical to that between adjacent ones of first sensor electrodes 111.

Figure 18:
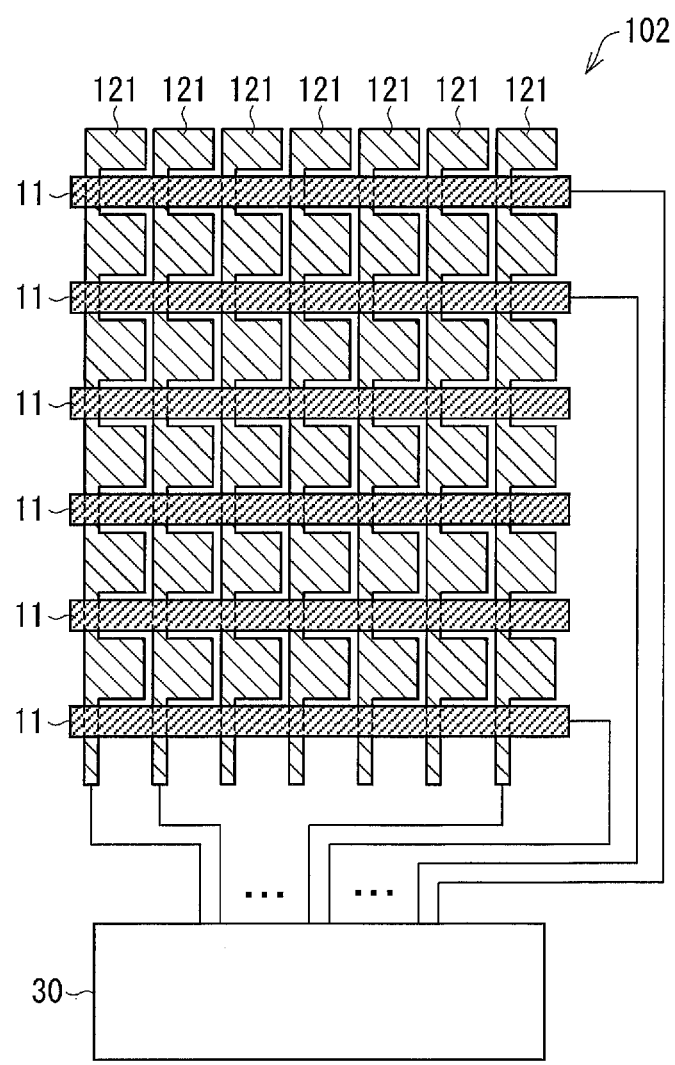
FIG. 18 is a plan view illustrating a configuration of the touch panel substrate of Embodiment 3 which configuration is observed when the first electrode layer is superimposed over the second electrode layer.

FIG. 18 is a plan view illustrating a configuration of the touch panel substrate 102 of Embodiment 3 which configuration is observed when the first electrode layer 110 is superimposed over the second electrode layer 120.

As illustrated in FIG. 18, the touch panel substrate 102 has such a structure that the first electrode layer 110 is superimposed over the second electrode layer 120 via a substrate 6 so that, when viewed from above, the first sensor electrodes 111 intersect the second sensor electrodes 121 and each of the first sensor electrodes 111 overlaps one of the recesses of each of the second sensor electrodes 121.

According to the touch panel substrate 102 of Embodiment 3, since each of the first sensor electrodes 111 overlaps one of the recesses of each of the second sensor electrodes 121, it is possible to reduce an area where the first sensor electrodes 111 overlap the second sensor electrodes 121 when viewed from above. Further, no dummy electrode is provided in the first electrode layer 110.

Therefore, the touch panel substrate 102 of Embodiment 3 has a small region where, when viewed from above, conductor line patterns included in the first electrode layer 110 overlap conductor line patterns included in the second electrode layer 120, as compared with that of the touch panel substrate 2.

Accordingly, the touch panel substrate 102 of Embodiment 3 is larger in light transmittance as a whole than that of the whole of the touch panel substrate 2 of Embodiment 1. Therefore, according to an electronic device 1 made up of the touch panel substrate 102 and a display device 3, it is possible to efficiently transmit light emitted from the display device 3, and possible to improve visibility of a displayed image.

<Second Sensor Electrode>

Figure 19:
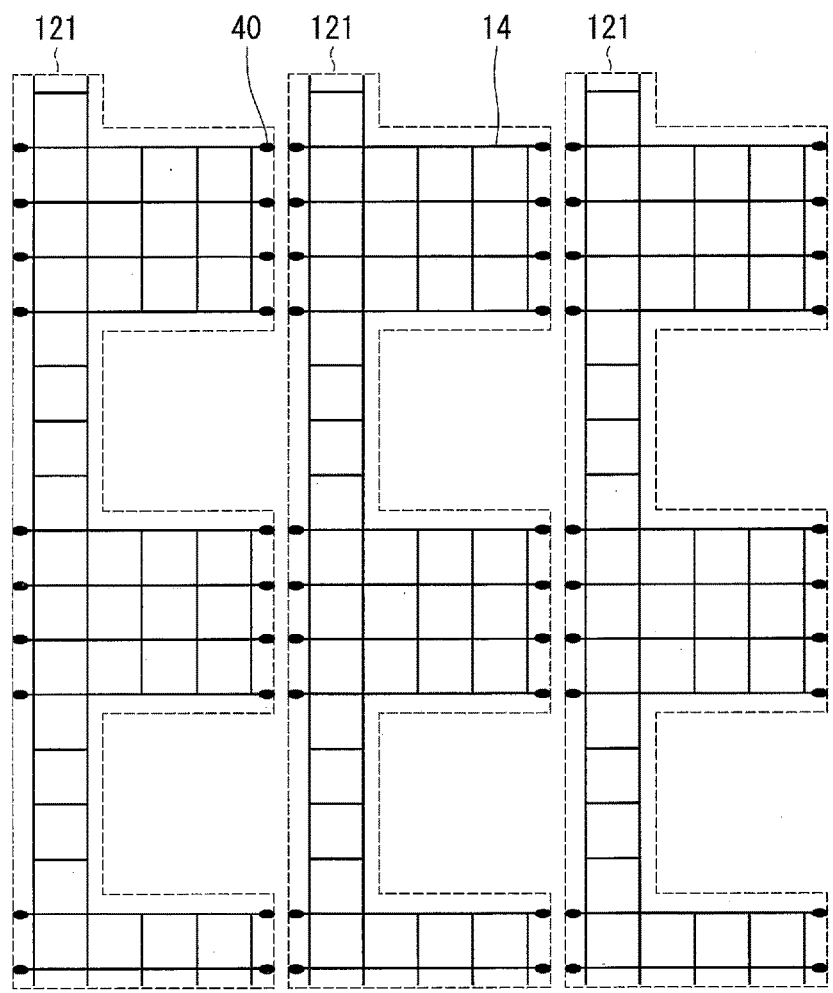
FIG. 19 is a plan view illustrating, in detail, the configuration of the second electrode layer of the touch panel substrate of Embodiment 3.

FIG. 19 is a plan view illustrating, in detail, the configuration of the second electrode layer 120 of Embodiment 3.

As illustrated in FIG. 19 with the use of broken lines, the second sensor electrodes 121, each including second conductor lines 14 arranged on an identical plane surface in a net-like pattern, are formed in the second electrode layer 120. That is, the second conductor lines 14 constitute each of the second sensor electrodes 121.

Further, as illustrated in FIG. 19 with the use of the broken lines, an outer edge of an electrode has such a shape that a rectangle serving as an axis has a plurality of rectangles each serving as a branch. A shape (side) of part of the outer edge of the electrode, which part faces another adjacent second sensor electrode 121, is defined by ends of the second conductor lines 14.

As illustrated in FIG. 19, the shape (side) of the part of the outer edge of the second sensor electrode 121, which part faces the outer edge of another adjacent second sensor electrode 121, is defined by the ends of the second conductor lines 14. The ends of the second conductor lines 14 have respective wide width parts 40.

Note that the wide width parts 40 are provided so as not to overlap intersections of the second conductor lines 14.

With this configuration, similar to the touch panel substrate 2 of Embodiment 1, the electronic device 1 made up of the touch panel substrate 102 and the display device 3 is capable of (i) causing a pattern (bright line) corresponding to a region between electrodes not to be easily recognized visually by a viewer of an image displayed by the display device 3 and (ii) suppressing a deterioration of display quality of such a displayed image.

[Embodiment 4]

The following description will discuss another embodiment of the present invention with reference to FIGS. 20 to 25. Note that, for convenience, identical reference numerals will be given to respective members having functions identical to those of the members described in the foregoing Embodiments, and descriptions of the members will be omitted.

<Electrode Layer>

Figure 20:
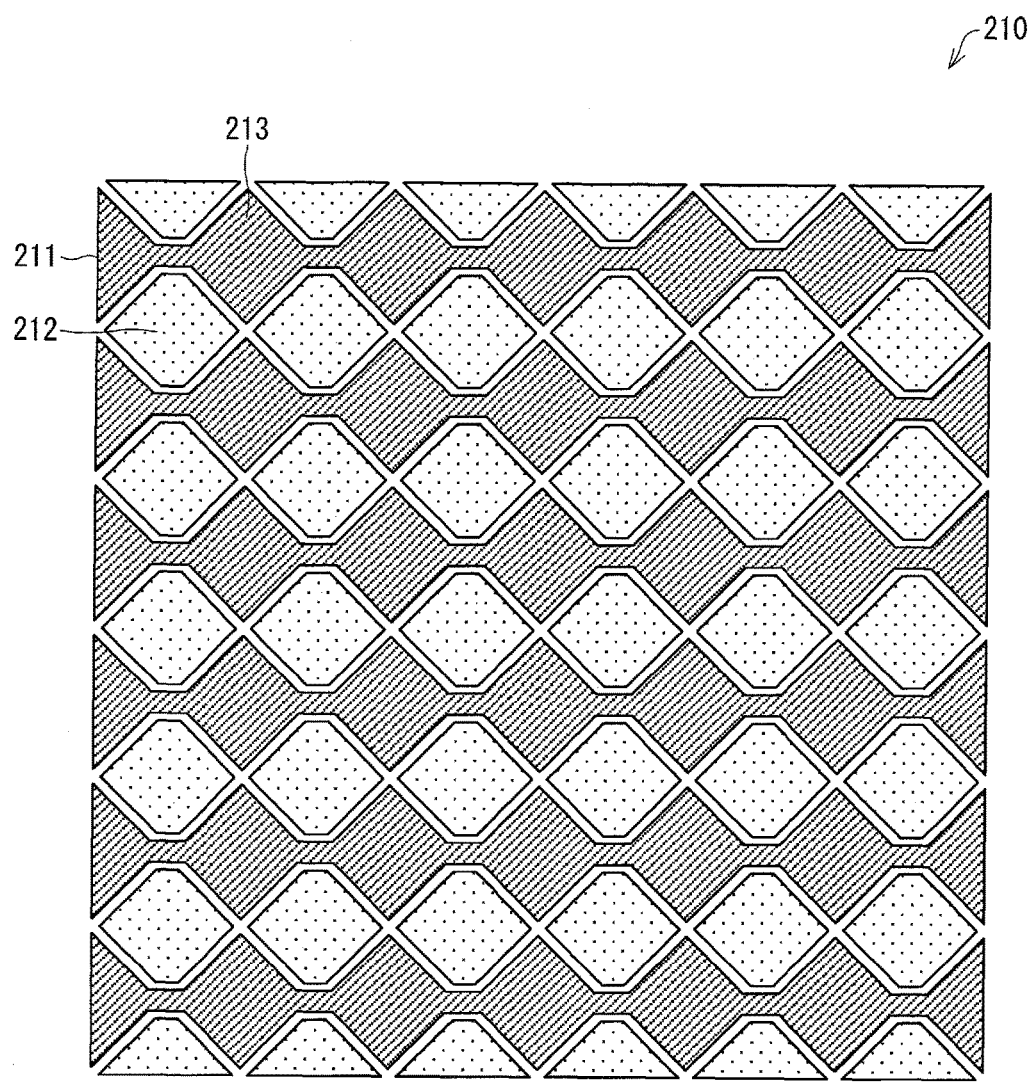
FIG. 20 is a plan view illustrating a configuration of a first electrode layer of a touch panel substrate of Embodiment 4.
Figure 21:
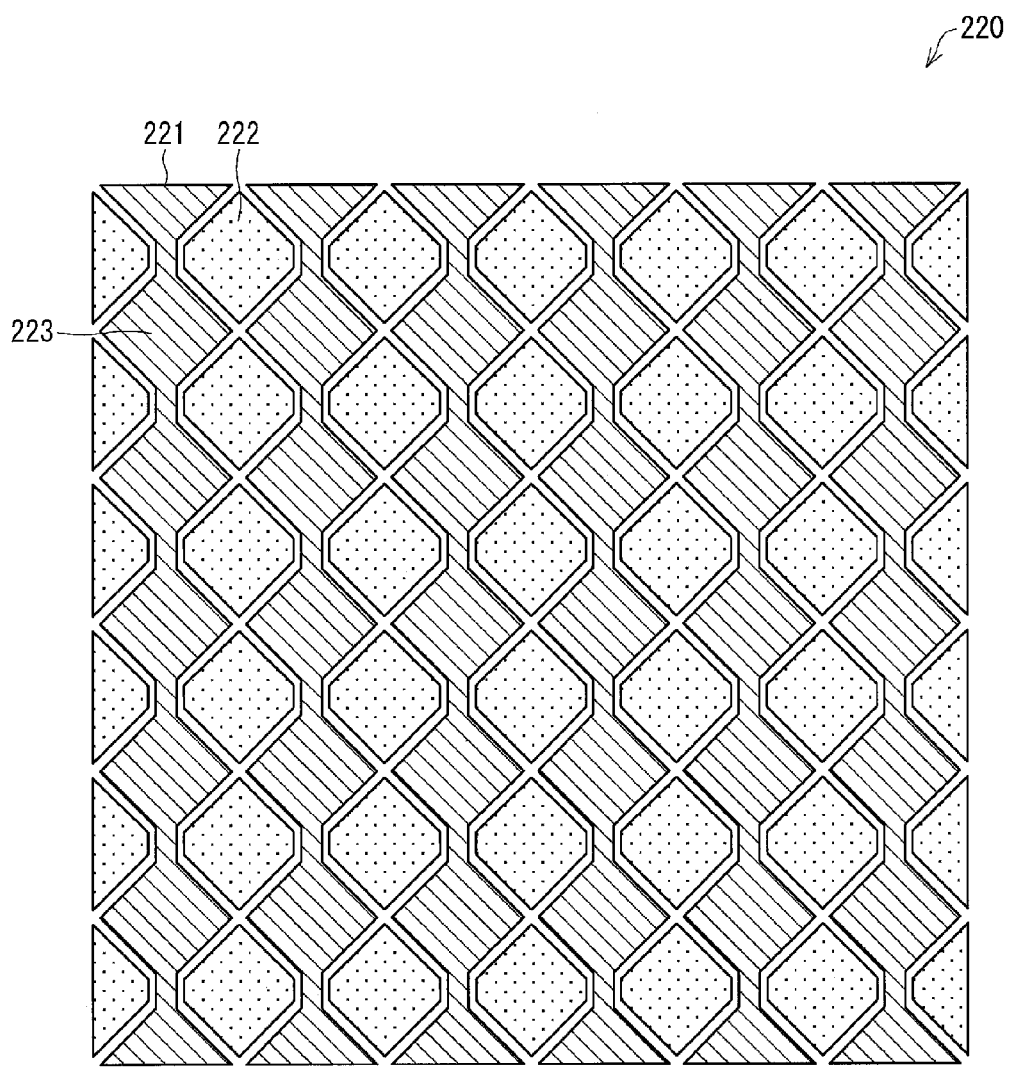
FIG. 21 is a plan view illustrating a configuration of a second electrode layer of the touch panel substrate of Embodiment 4.

FIG. 20 is a plan view illustrating a configuration of a first electrode layer 210 of a touch panel substrate of Embodiment 4. FIG. 21 is a plan view illustrating a configuration of a second electrode layer 220 of the touch panel substrate of Embodiment 4.

As illustrated in FIG. 20, the first electrode layer 210 of Embodiment 4 has first sensor electrodes 211 which extend in a lateral direction in FIG. 20. Each of the first sensor electrodes 211 has a plurality of grid electrodes 213 each having a quadrangular shape. Adjacent ones of the plurality of grid electrodes 213 are connected to each other via a vertex of each of the adjacent ones of the plurality of grid electrodes 213. First dummy electrodes 212 are provided so as to fill in respective spaces between the plurality of grid electrodes 213.

As illustrated in FIG. 21, the second electrode layer 220 of Embodiment 4 has second sensor electrodes 221 which extend in a longitudinal direction in FIG. 21. Each of the second sensor electrodes 221 has a plurality of grid electrodes 223 each having a quadrangular shape. Adjacent ones of the plurality of grid electrodes 223 are connected to each other via a vertex of each of the adjacent ones of the plurality of grid electrodes 223. Second dummy electrodes 222 are provided so as to fill in respective spaces between the plurality of grid electrodes 223.

Figure 22:
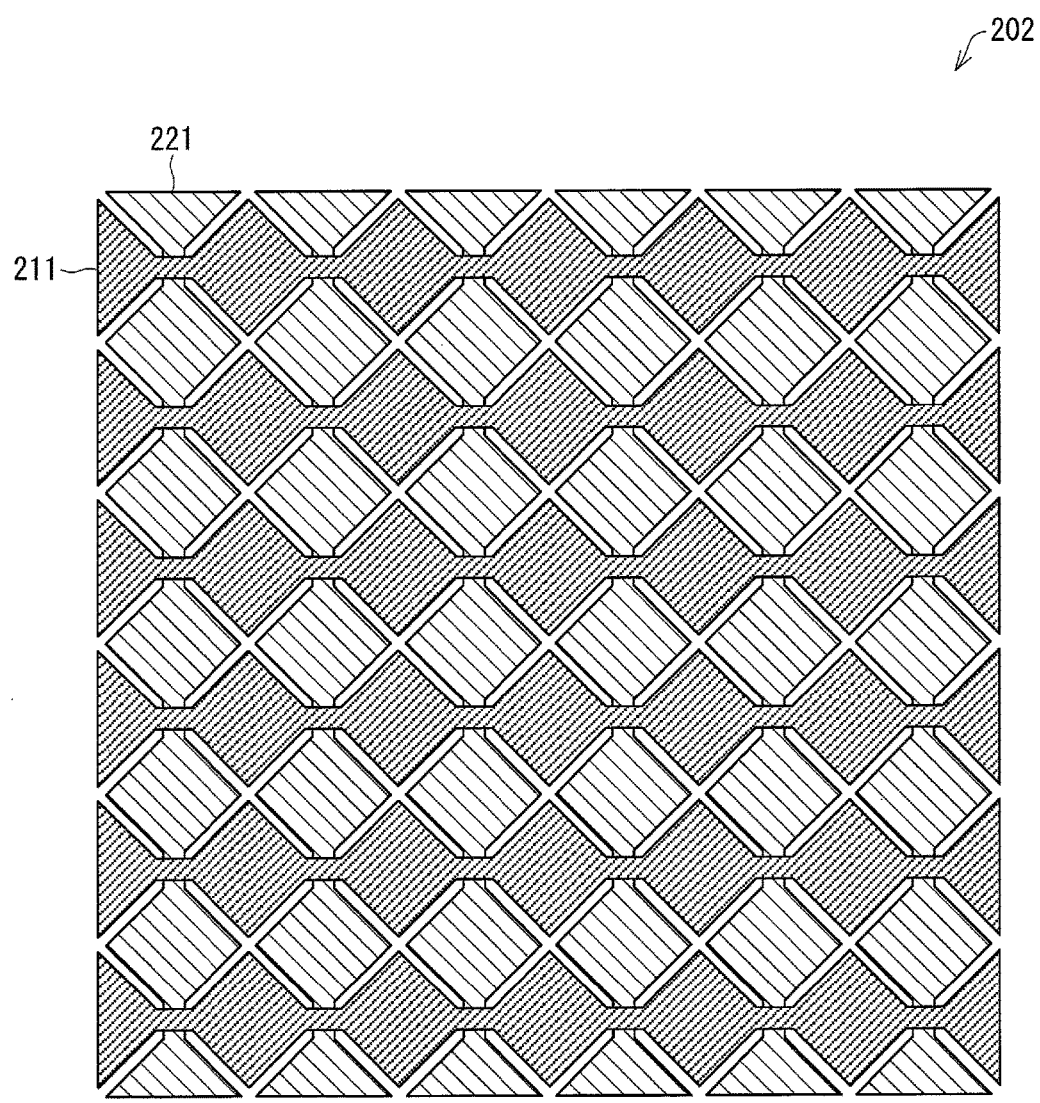
FIG. 22 is a plan view illustrating a configuration of the touch panel substrate of Embodiment 4 which configuration is observed when the first electrode layer is superimposed over the second electrode layer.

FIG. 22 is a plan view illustrating a configuration of a touch panel substrate 202 of Embodiment 4 which configuration is observed when the first electrode layer 210 is superimposed over the second electrode layer 220.

As illustrated in FIG. 22, the touch panel substrate 202 has such a structure that the first electrode layer 210 is superimposed over the second electrode layer 220 via a substrate 6 so that the first sensor electrodes 211 intersect the second sensor electrodes 221 when viewed from above. Further, when viewed from above, the plurality of grid electrodes 213, serving as main part of the first sensor electrodes 211, are superimposed over the respective second dummy electrodes 222, and the plurality of grid electrodes 223, serving as main part of the second sensor electrodes 221, are superimposed over the respective first dummy electrodes 212.

The touch panel substrate 202 of Embodiment 4 thus has (i) the first sensor electrodes 211 each having diamond patterns and (ii) the second sensor electrodes 221 each having diamond patterns.

<First Sensor Electrode>

FIG. 23 is a plan view illustrating, in detail, the configuration of the first electrode layer 210 of Embodiment 4.

As illustrated in FIG. 23, the first sensor electrodes 211, each including first conductor lines 13 arranged on an identical plane surface in a net-like pattern, and the first dummy electrodes 212, each including first conductor lines 13 arranged on an identical plane surface in a net-like pattern, are formed in the first electrode layer 210. That is, the first conductor lines 13 constitute each of the first sensor electrodes 211 or the first dummy electrodes 212.

The first conductor lines 13 included in one electrode are electrically insulated from the first conductor lines 13 included in another electrode.

The first sensor electrode 211 has a plurality of grid electrodes 213 each having a quadrangular shape. Adjacent ones of the plurality of grid electrodes 213 are connected to each other via a first bridge conductor line 50. An electrode corresponding to a first dummy electrode 121 has a substantially square shape.

A shape (side) of part of an outer edge of the electrode which part faces another adjacent electrode is defined by ends of the first conductor lines 13.

As illustrated in FIG. 23, the ends of the first conductor lines 13, which ends define the shape of the outer edge of the electrode, have respective wide width parts 40 each of which is wider than the other part of the first conductor lines 13.

With this configuration, similar to the touch panel substrate 2 of Embodiment 1, an electronic device 1 made up of the touch panel substrate 202 and a display device 3 is capable of (i) causing a pattern (bright line) corresponding to a region between the first sensor electrode 211 and the first dummy electrode 212 not to be easily recognized visually by a viewer of an image displayed by the display device 3 and (ii) suppressing a deterioration of display quality of such a displayed image.

Note that conductor lines included in a second sensor electrode 221 and conductor lines included in a second dummy electrode 222 can also have respective wide width parts 40. Similar to the first electrode layer 210, this makes it possible to (i) cause a pattern (bright line) corresponding to a region between the second sensor electrode 221 and the second dummy electrode 222 not to be easily recognized visually and (ii) suppress a deterioration of display quality of a displayed image.

Note here that the configuration of the first electrode layer 210 is not limited to such. For example, the first electrode layer 210 can alternatively have a configuration illustrated in FIG. 24 or 25.

Figure 24:
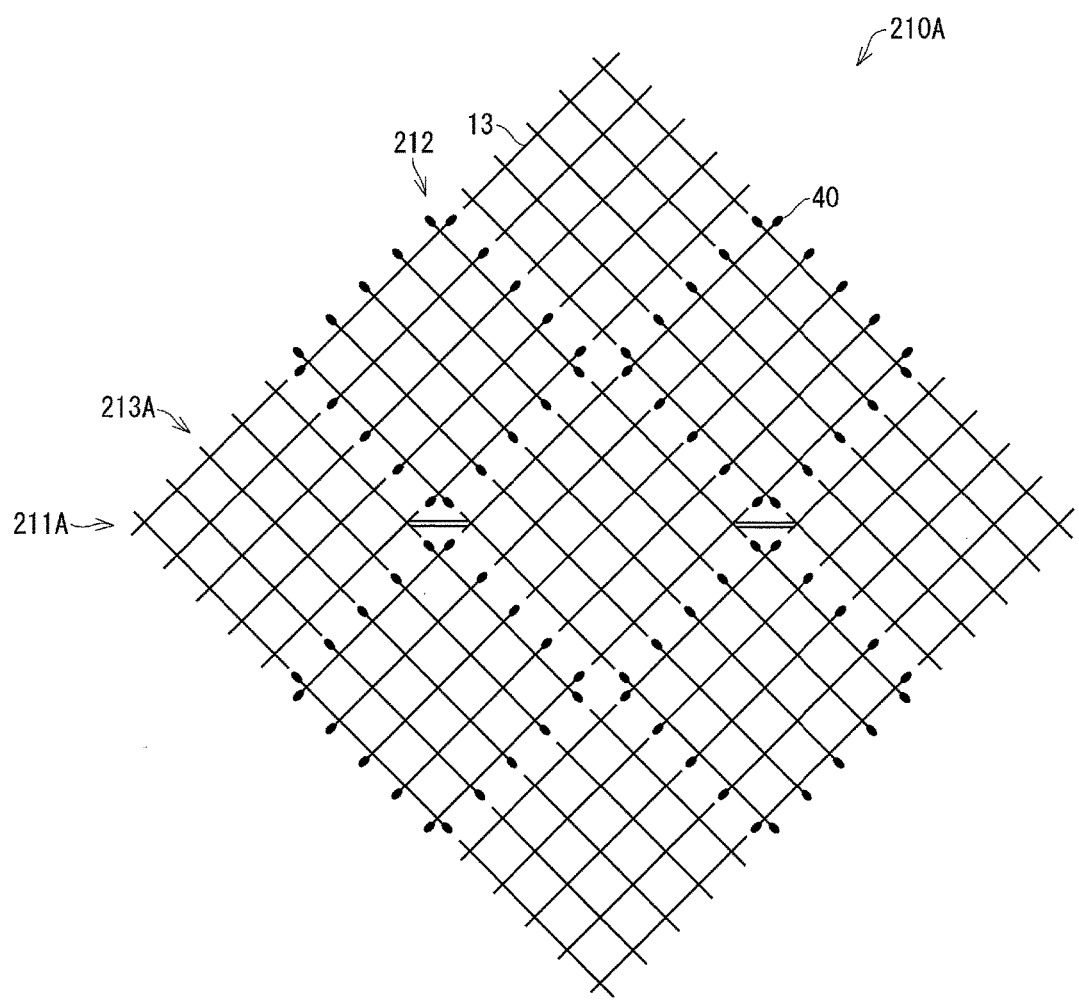
FIG. 24 is a plan view illustrating, in detail, another example configuration of the first electrode layer of the touch panel substrate of Embodiment 4.

FIG. 24 is a plan view illustrating, in detail, a configuration of a first electrode layer 210A of Embodiment 4.

According to the first electrode layer 210A, first conductor lines 13, included in an electrode corresponding to a first sensor electrode 211A, have no wide width part 40 (see FIG. 24). On the other hand, first conductor lines 13, included in an electrode corresponding to a first dummy electrode 212, have respective wide width parts 40.

In this manner, it is only necessary that ends of the first conductor lines 13, which ends define one of sides, facing each other, of adjacent electrodes, have respective wide width parts 40.

Figure 25:
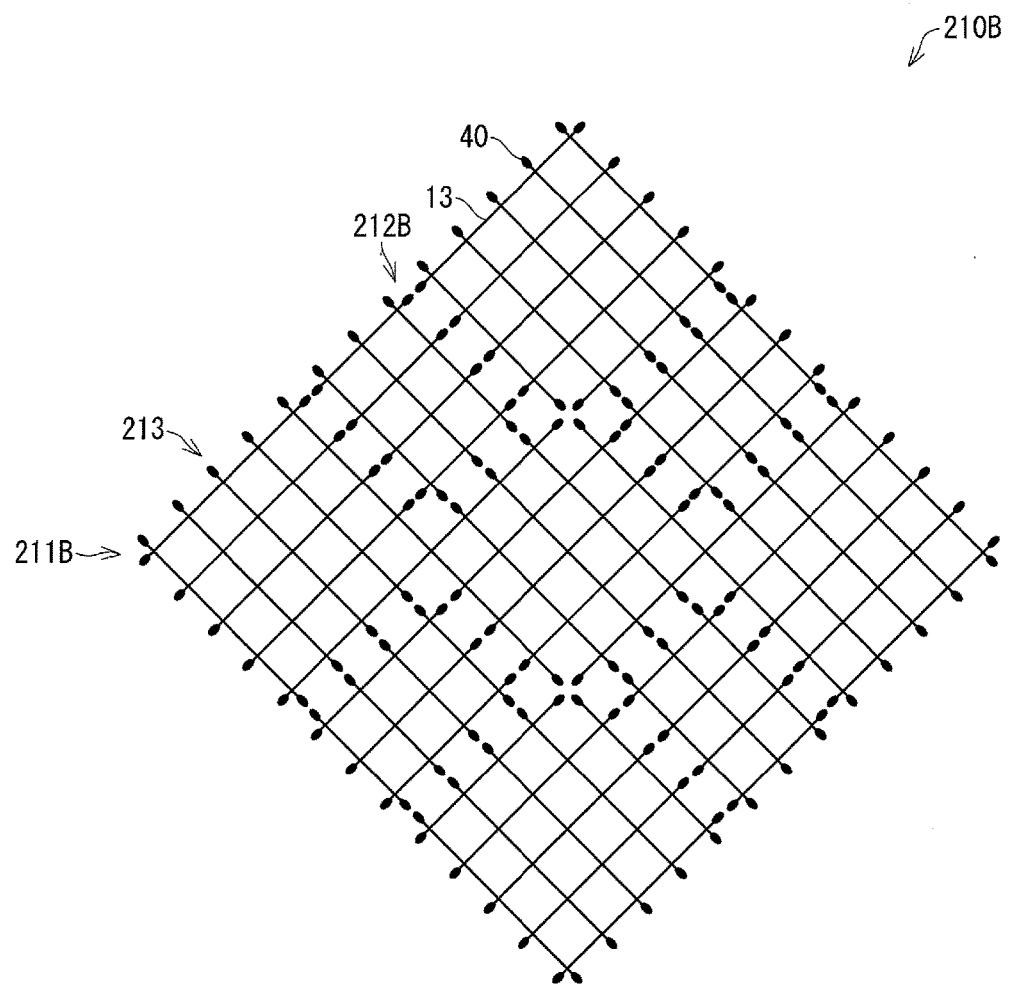
FIG. 25 is a plan view illustrating, in detail, further another example configuration of the first electrode layer of the touch panel substrate of Embodiment 4.

FIG. 25 is a plan view illustrating, in detail, a configuration of a first electrode layer 210B of Embodiment 4.

A first sensor electrode 211B can be configured such that a plurality of grid electrodes 213, each having a quadrangular shape, are connected to each other without the use of a first bridge conductor line. More specifically, adjacent ones of the plurality of grid electrodes 213 can be connected to each other while the adjacent ones of the plurality of grid electrodes 213 are sharing a vertex. In this case, as illustrated in FIG. 25, an outer edge of an electrode corresponding to the first sensor electrode 211B also has such a shape that a plurality of electrodes, each having a quadrangular shape, are connected to each other while adjacent ones of the plurality of electrodes are sharing a vertex.

[Embodiment 5]

Figure 26:
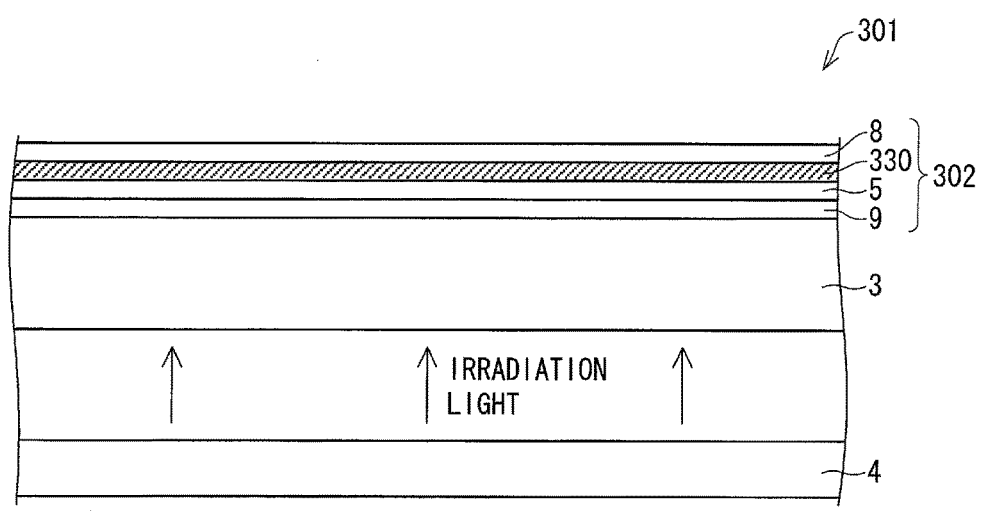
FIG. 26 is a cross-sectional view illustrating an electronic device of Embodiment 5 of the present invention.
Figure 27:
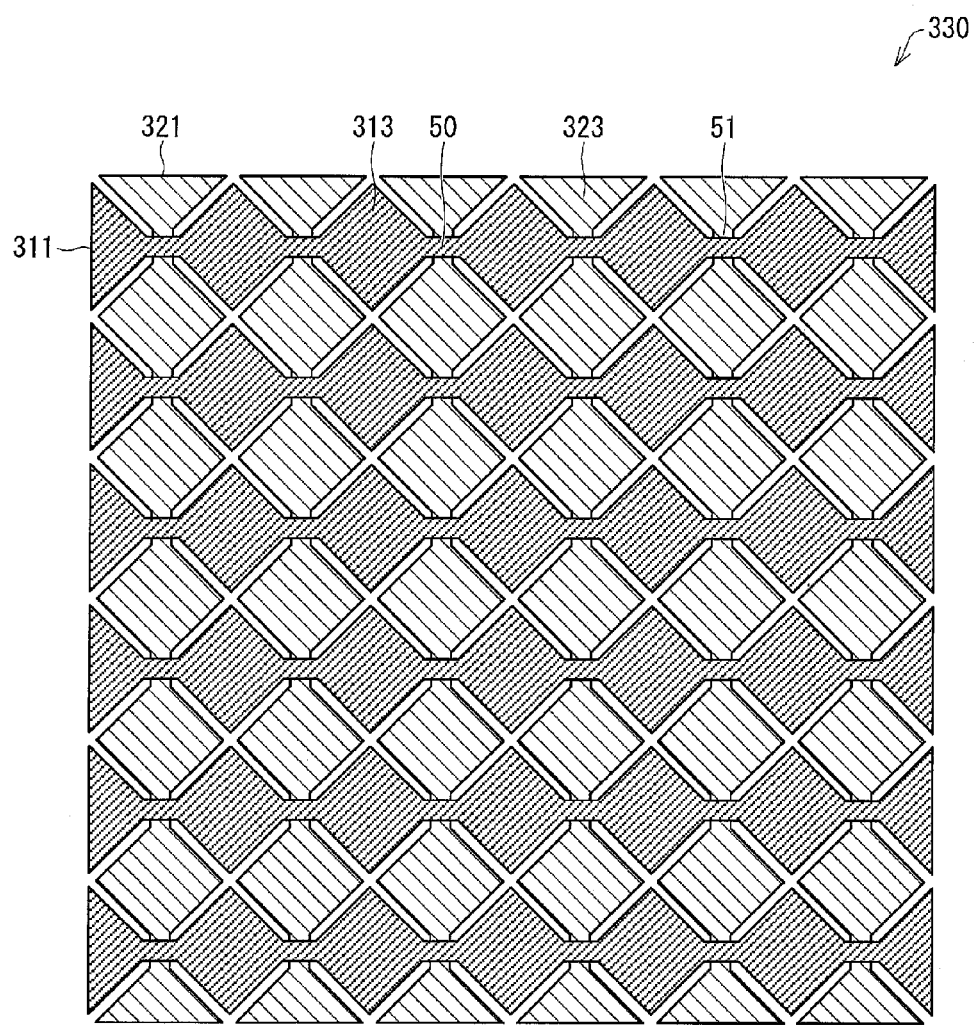
FIG. 27 is a plan view illustrating a configuration of an electrode layer of a touch panel substrate of Embodiment 5.
Figure 29:
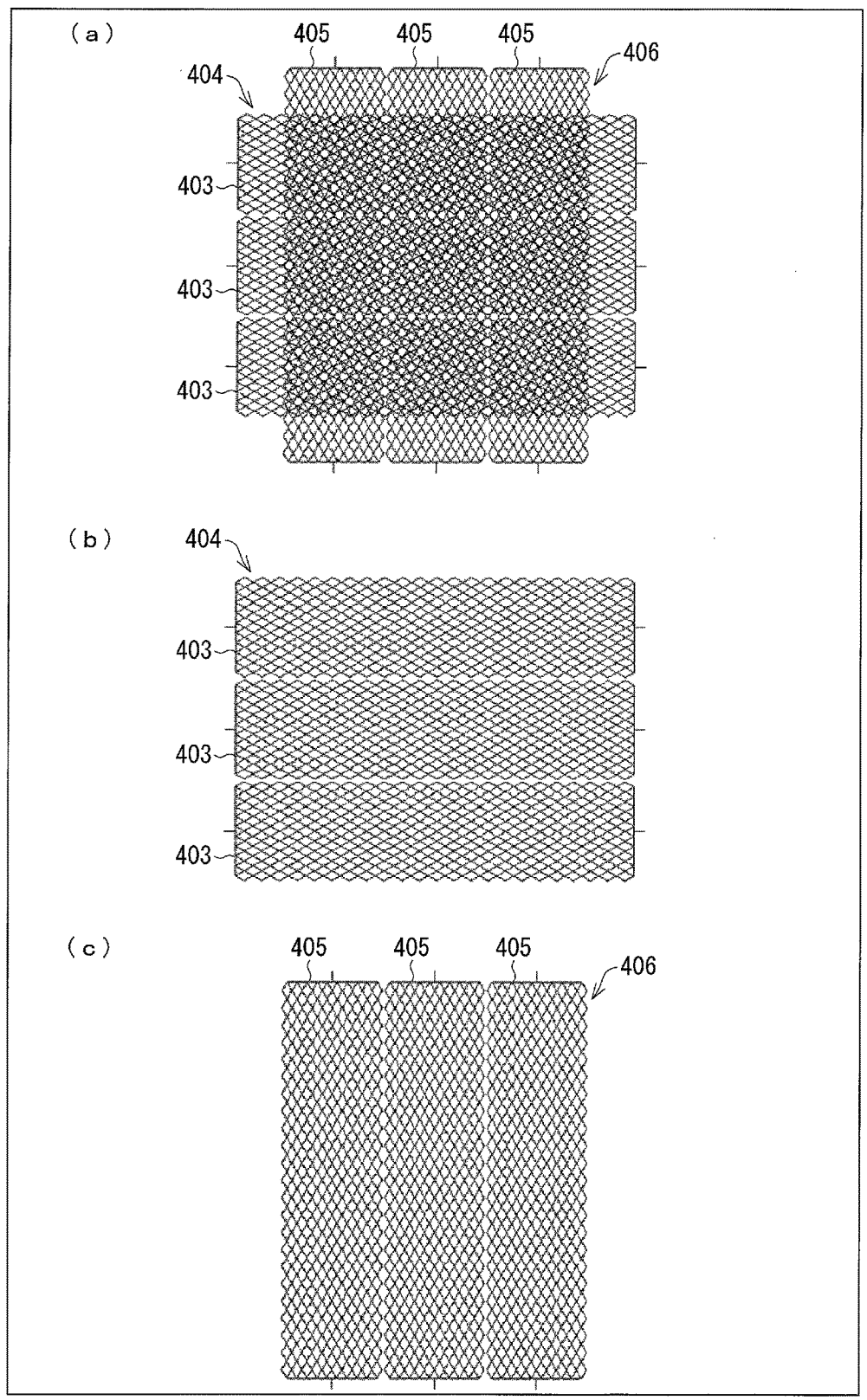
FIG. 29 is a plan view illustrating a configuration of a touch panel device of Patent Literature 1 serving as a conventional technique.

The following description will discuss another embodiment of the present invention with reference to FIGS. 26 through 28. Note that, for convenience, identical reference numerals will be given to respective members having functions identical to those of the members described in the foregoing Embodiments, and descriptions of the members will be omitted.

<Electrode Layer>

FIG. 26 is a cross-sectional view illustrating an electronic device 301 of Embodiment 5. Unlike the touch panel substrates of the other Embodiments, the electronic device 301 of Embodiment 5 has a single electrode layer 330, and first sensor electrodes 311 and second sensor electrodes 321 are arranged in the single electrode layer 330.

FIG. 27 is a plan view illustrating a configuration of the electrode layer 330 of Embodiment 5.

The electrode layer 330 of Embodiment 5 has (i) the first sensor electrodes 311 which extend in a lateral direction in FIG. 27 and (ii) the second sensor electrodes 321 which extend in a longitudinal direction in FIG. 27.

Each of the first sensor electrodes 311 has a plurality of grid electrodes 313 each having a quadrangular shape, and adjacent ones of the plurality of grid electrodes 313 are connected to each other via a first bridge conductor line 50.

Each of the second sensor electrodes 321 has a plurality of grid electrodes 323 each having a quadrangular shape, and adjacent ones of the plurality of grid electrodes 323 are connected to each other via a second bridge conductor line 51.

The first sensor electrodes 311 and the second sensor electrodes 321 are arranged on a single substrate so that the plurality of grid electrodes 313 do not overlap the plurality of grid electrodes 323.

<Sensor Electrode>

FIG. 28 is a plan view illustrating, in detail, the configuration of the electrode layer 330 of Embodiment 5.

As illustrated in FIG. 28, the first sensor electrodes 311, each including first conductor lines 13 arranged on an identical plane surface in a net-like pattern, are formed in the electrode layer 330. That is, the first conductor lines 13 constitute each of the first sensor electrodes 311.

Further, the second sensor electrodes 321, each including second conductor lines 14 arranged on an identical plane surface in a net-like pattern, are formed in the electrode layer 330. That is, the second conductor lines 14 constitute each of the second sensor electrodes 321.

The first conductor lines 13 included in a first sensor electrode 311 are electrically insulated from the first conductor lines 13 included in another first sensor electrode 311 and from the second conductor lines 14.

The first sensor electrode 311 has the plurality of grid electrodes 313 each having a quadrangular shape, and adjacent ones of the plurality of grid electrodes 313 are connected to each other via the first bridge conductor line 50.

A second sensor electrode 321 has the plurality of grid electrodes 323 each having a quadrangular shape, and adjacent ones of the plurality of grid electrodes 323 are connected to each other via the second bridge conductor line 51.

The first bridge conductor line 50 intersects the second bridge conductor line 51 when viewed from above. An insulating layer is provided between the first bridge conductor line 50 and the second bridge conductor line 51 so that the first bridge conductor line 50 is electrically insulated from the second bridge conductor line 51.

A shape (side) of part of an outer edge of an electrode, which part faces an adjacent electrode, is defined by ends of the first conductor lines 13 or ends of the second conductor lines 14.

As illustrated in FIG. 28, the ends of the first conductor lines 13 or the ends of the second conductor lines 14, which ends define the shape of the outer edge of the electrode, have respective wide width parts 40 each of which is wider than the other part of the first conductor lines 13 or the second conductor lines 14.

With this configuration, similar to the touch panel substrate 2 of Embodiment 1, an electronic device 1 made up of a touch panel substrate 302 and a display device 3 is capable of (i) causing a pattern (bright line) corresponding to a region between the first sensor electrode 311 and the second sensor electrode 321 not to be easily recognized visually by a viewer of an image displayed by the display device 3 and (ii) suppressing a deterioration of display quality of such a displayed image.

[Summary]

A touch panel substrate (2, 102, 202, 302) in accordance with Aspect 1 of the present invention is a touch panel substrate including: a substrate (6); and an electrode layer (10, 110, 210, 20, 120, 220, 330) provided on the substrate, the electrode layer being made up of conductor lines (13, 14) uniformly arranged in a net-like pattern on the substrate, the conductor lines being divided into pieces so that the pieces of the conductor lines constitute a respective plurality of electrodes, at least one of a pair of ends of the conductor lines, which pair of ends face each other via a dividing line along which each of the conductor lines is divided, having a wide width part (40, 40a through 40e) which is wider than the other part of the conductor lines, when viewed from above.

According to the above configuration, ends of the conductor lines which ends define an outer edge of an electrode have respective wide width parts. This causes an end of the electrode to be lower in light transmittance than a vicinity of the center of the electrode.

Meanwhile, a region between adjacent electrodes is a space where no conductor line is provided. The space is high in light transmittance.

Therefore, in a case where the space and ends of the adjacent electrodes are regarded as a boundary region, high light transmittance in the space and low light transmittance in the ends of the adjacent electrodes are cancelled out in the boundary region.

This allows a variation in light transmittance to be reduced and small between (i) the boundary region and (ii) a vicinity of the center of each of the adjacent electrodes. That is, it is possible to suppress, as a whole, ununiformity of the light transmittance of the electrode layer.

Therefore, according to an electronic device made up of the touch panel substrate and a display device, in a case where a user of the electronic device looks at an image displayed by the display device, it is possible to cause a difference in brightness, between (i) a vicinity of the region between the adjacent electrodes and (ii) the vicinity of the center of each of the adjacent electrodes, to be at or below a limit above which a human can recognizes the difference.

This makes it possible to (i) cause a pattern corresponding to the region between the adjacent electrodes not to be easily recognized visually and (ii) suppress a deterioration of display quality of such a displayed image.

The touch panel substrate in accordance with Aspect 2 of the present invention can be arranged such that, in Aspect 1, the plurality of electrodes are formed by dividing the conductor lines, uniformly arranged in the net-like pattern, so as to avoid an intersection of the conductor lines.

The above configuration allows the conductor lines to be formed with a simple configuration and with a simple method.

Furthermore, it is possible to form the electrode layer, having uniform conductor line patterns, without expanding a space where no conductor line is provided. Such a way to form the electrode layer is applicable to conductor line patterns in which a conductor line pitch is narrow, and is favorable to maintain uniformity of the conductor line patterns.

The touch panel substrate in accordance with Aspect 3 of the present invention can be arranged such that: in Aspect 2, the pair of ends of the conductor lines are formed by dividing the conductor lines uniformly arranged in the net-like pattern; and each of the pair of ends has the wide width part.

The above configuration makes it possible to form, with a simple method, (i) pairs of ends of the conductor lines and (ii) the plurality of electrodes each having an outer edge at least part of which has a shape defined by ends of the conductor lines.

The touch panel substrate in accordance with Aspect 4 of the present invention can be arranged such that, in any one of Aspects 1 through 3, one of adjacent ones of the plurality of electrodes, which are formed by dividing the conductor lines, is a touch sensor electrode, whereas the other is a dummy electrode.

The touch panel substrate in accordance with Aspect 5 of the present invention can be arranged such that, in any one of Aspects 1 through 3, each of adjacent ones of the plurality of electrodes, which are formed by dividing the conductor lines, is a touch sensor electrode.

The touch panel substrate in accordance with Aspect 6 of the present invention can be arranged such that, in any one of Aspects 1 through 5, an area of the wide width part is not more than $a \times (a-2d)/135$ when viewed from above, where, when viewed from above, "d" denotes a width of part, other than the wide width part, of the conductor lines, and "a" denotes an interval between adjacent ones of the conductor lines which adjacent ones extend in parallel.

The above configuration makes it possible to suppress ununiformity of light transmittance which ununiformity is caused by the wide width part itself.

The touch panel substrate in accordance with Aspect 7 of the present invention can be arranged such that, in any one of Aspects 1 through 6, a width of the wide width part is not more than 50 μm when viewed from above.

The above configuration makes it possible to suppress ununiformity of light transmittance which ununiformity is caused by the wide width part itself.

The touch panel substrate in accordance with Aspect 8 of the present invention can be arranged such that, in any one of Aspects 1 through 7, a distance, between the wide width part and an intersection at which the conductor lines intersect each other, is not less than 100 μm when viewed from above.

The above configuration makes it possible to suppress ununiformity of light transmittance which ununiformity is caused by the wide width part and the intersection of the conductor lines.

The touch panel substrate in accordance with Aspect 9 of the present invention can be arranged such that, in any one of Aspects 1 through 8, an outer edge of each of the plurality of electrodes has a rectangular shape.

The touch panel substrate in accordance with Aspect 10 of the present invention can be arranged such that, in any one of Aspects 1 through 8, an outer edge of each of the plurality of electrodes has such a shape that a plurality of quadrangles are connected to each other via a vertex of each of the plurality of quadrangles.

An electronic device (1) in accordance with Aspect 11 of the present invention can include: a touch panel substrate of any one of Aspects 1 through 10; and a display device (3).

A method of manufacturing a touch panel substrate in accordance with Aspect 12 of the present invention is a method of manufacturing a touch panel substrate including a substrate and an electrode layer provided on the substrate, the method including the steps of: uniformly forming conductor lines in a net-like pattern on a plane surface of the substrate so that the conductor lines have a wide width part at a position other than an intersection at which the conductor lines intersect each other, the wide width part being wider than the other part of the conductor lines; and forming a plurality of electrodes by dividing the conductor lines across the wide width part, the plurality of electrodes including the conductor lines arranged in the net-like pattern.

The above method makes it possible to manufacture, with a simple method, a touch panel substrate configured such that pairs of ends of conductor lines are formed, each outer edge of electrodes is defined by ends of the conductor lines, and each of the pairs of ends of the conductor lines have respective wide width parts.

The present invention is not limited to the description of the embodiments, but may be altered by a skilled person in the art within the scope of the claims. An embodiment derived from a proper combination of technical means disclosed in different embodiments is also encompassed in the technical scope of the present invention. Furthermore, by a combination of technical means disclosed in different embodiments, a new technical feature can be derived.

INDUSTRIAL APPLICABILITY

The present invention is preferably applicable to touch panel substrates including electrodes made up of conductor lines.

REFERENCE SIGNS LIST 1, 301 Electronic device
2, 102, 202, 302 Touch panel substrate
10, 110, 210 First electrode layer (electrode layer)
20, 120, 220 Second electrode layer (electrode layer)
330 Electrode layer
3 Display device
6 Substrate
13 First conductor line (conductor line)
14 Second conductor line (conductor line)
40, 40a through 40e Wide width part
11, 111, 211, 311 First sensor electrode (electrode)
21, 121, 221, 321 Second sensor electrode (electrode)
a Conductor line pitch
d Conductor line width
s Area of wide width part

The invention claimed is:
1. A touch panel substrate comprising:
a substrate; and
a first electrode layer on a first surface of the substrate, wherein
the first electrode layer includes conductor lines uniformly arranged in a grid and directly physically connected to each other at an intersection of respective conductive lines in the grid on the first surface of the substrate,
the conductor lines being divided into groups so that the groups of the conductor lines constitute a respective plurality of electrodes,
at least one of a pair of ends of the conductor lines extend along a same straight line, the at least one of the pair of ends directly oppose each other along the same straight line via a dividing line along which each of the conductor lines is divided, and includes a wide width portion which is wider than another portion of the conductor lines, when viewed in a plan view, the wide width portion is not at the intersection where the conductor lines are connected to each other, and conductor lines of one of the groups are aligned in parallel along same straight lines with conductor lines of a directly adjacent one of the groups.

2. The touch panel substrate as set forth in claim 1, wherein the plurality of electrodes are defined by dividing the conductor lines, uniformly arranged in the grid, so as to avoid the intersection of the conductor lines.

3. The touch panel substrate as set forth in claim 2, wherein:

the pair of ends of the conductor lines are defined by dividing the conductor lines uniformly arranged in the grid; and each of the pair of ends includes the wide width portion.

4. The touch panel substrate as set forth in claim 1, wherein one of adjacent ones of the plurality of electrodes, which are defined by dividing the conductor lines, is a touch sensor electrode, and another of the plurality of electrodes is a dummy electrode.

5. The touch panel substrate as set forth in claim 1, wherein each of adjacent ones of the plurality of electrodes, which are defined by dividing the conductor lines, is a touch sensor electrode.

6. The touch panel substrate as set forth in claim 1, wherein an area of the wide width portion is not more than $a \times (a-2d)/135$ when viewed in the plan view, where, when viewed in the plan view, "d" denotes a width of a portion, other than the wide width portion, of the conductor lines, and "a" denotes an interval between adjacent ones of the conductor lines which adjacent ones extend in parallel.

7. The touch panel substrate as set forth in claim 1, wherein a width of the wide width portion is not more than 50 μm when viewed in the plan view.

8. The touch panel substrate as set forth in claim 1, wherein a distance, between the wide width portion and an intersection at which the conductor lines intersect each other, is not less than 100 μm when viewed in the plan view.

9. The touch panel substrate as set forth in claim 1, wherein an outer edge of each of the plurality of electrodes has a rectangular shape.

10. The touch panel substrate as set forth in claim 1, wherein an outer edge of each of the plurality of electrodes has such a shape that a plurality of quadrangles are connected to each other via a vertex of each of the plurality of quadrangles.

11. An electronic device comprising:
a touch panel substrate recited in claim 1; and
a display device.

12. The touch panel substrate as set forth in claim 1, wherein the conductive lines of directly adjacent groups are aligned in the same straight line and spaced from each other by a spacing.

13. The touch panel substrate as set forth in claim 1, further comprising a second electrode layer on a second surface of the substrate opposite to the first surface of the substrate.

14. A method of manufacturing a touch panel substrate including a substrate and a first electrode layer on a first surface of the substrate, the method comprising:

uniformly forming conductor lines in a grid on the first surface of the substrate so that the conductor lines include a wide width portion at a position other than an intersection at which the conductor lines intersect each other, the wide width portion being wider than another portion of the conductor lines;

forming a plurality of electrodes by dividing the conductor lines across the wide width portion, the plurality of electrodes including the conductor lines arranged in the grid and directly physically connected to each other at an intersection of respective conductor lines in the grid; and forming a dividing line between each of the plurality of electrodes; wherein conductor lines of one of the plurality of electrodes are aligned in parallel along same straight lines with conductor lines of a directly adjacent one of the plurality of electrodes.

15. The method of manufacturing a touch panel substrate as set forth in claim 12, further comprising forming a second electrode layer on a second surface of the substrate opposite to the first surface of the substrate.

* * * * *